(12) United States Patent
Ajgaonkar et al.

(10) Patent No.: US 7,488,930 B2
(45) Date of Patent: Feb. 10, 2009

(54) MULTI-CHANNEL LOW COHERENCE INTERFEROMETER

(75) Inventors: Mahesh Ajgaonkar, Holland, PA (US); Gerard A. Alphonse, Princeton, NJ (US)

(73) Assignee: Medeikon Corporation, Holland, PA (US)

( * ) Notice: Subject to any disclaimer, the term of this patent is extended or adjusted under 35 U.S.C. 154(b) by 194 days.

(21) Appl. No.: 11/445,514

(22) Filed: Jun. 2, 2006

(65) Prior Publication Data
US 2007/0278389 A1 Dec. 6, 2007

(51) Int. Cl.
G02B 6/00 (2006.01)

(52) U.S. Cl. .............................. 250/227.19; 250/227.29; 356/477; 385/12

(58) Field of Classification Search ............ 250/227.19, 250/227.27; 356/477–479, 497; 385/12
See application file for complete search history.

(56) References Cited

U.S. PATENT DOCUMENTS

| | | | |
|---|---|---|---|
| 4,883,953 A | 11/1989 | Koashi | |
| 5,173,747 A | 12/1992 | Boiarski et al. | |
| 5,202,745 A | 4/1993 | Sorin | |
| 5,321,501 A | 6/1994 | Swanson | |
| 5,341,205 A | 8/1994 | McLandrich | |
| 5,383,467 A | 1/1995 | Auer | |
| 5,398,681 A | 3/1995 | Kupershmidt | |
| 5,434,791 A | 7/1995 | Koko | |
| 5,459,570 A | 10/1995 | Swanson | |
| 5,465,147 A | 11/1995 | Swanson | |
| 5,491,552 A | 2/1996 | Knuttel | |
| 5,501,226 A | 3/1996 | Petersen | |
| 5,507,288 A | 4/1996 | Bocker | |
| 5,549,114 A | 8/1996 | Petersen | |

(Continued)

FOREIGN PATENT DOCUMENTS

EP 0317121 A2 5/1989

(Continued)

OTHER PUBLICATIONS

International Search Report, PCT/US2004/042643, May 20, 2005.

(Continued)

*Primary Examiner*—Kevin Pyo
(74) *Attorney, Agent, or Firm*—Cantor Colburn LLP

(57) ABSTRACT

A multi-channel low coherence interferometer having sensing and reference arms, at least one of which has variable delay. The sensing arm includes an optical switch for connecting to two or more probe arms. The distal ends of the probe arms collect source light backscattered from a sample. The backscattered light collected by the distal end of a probe arm is combined with reference light and a low coherence interferometric signal is produced by a sweep of a variable delay of the device or a sweep of a variable frequency laser light source. The interference signal produced by the interaction of reference and sensing light at a detector measures backscattered light, which may be used to characterize the sample. The low coherence interferometric signals can provide information about the morphology, physical nature, composition, and properties of the sample. The device may be used to discriminate between finished surfaces and corroded surfaces, healthy and diseased tissue, and can sample the material or tissue in two or more areas. Versions of the invention include devices that are interferometers and or autocorrelators.

9 Claims, 8 Drawing Sheets

U.S. PATENT DOCUMENTS

| | | | |
|---|---|---|---|
| 5,565,986 A | 10/1996 | Knuttel | |
| 5,582,171 A | 12/1996 | Chornenky | |
| 5,710,630 A | 1/1998 | Essenpreis | |
| 5,726,801 A | 3/1998 | Pan | |
| 5,830,145 A | 11/1998 | Tenhoff | |
| 5,835,215 A | 11/1998 | Toida | |
| 5,835,642 A | 11/1998 | Gelikonov | |
| 5,836,877 A | 11/1998 | Zavislan | |
| 5,847,827 A | 12/1998 | Fercher | |
| 5,867,268 A | 2/1999 | Gelikonov | |
| 5,877,856 A | 3/1999 | Fercher | |
| 5,883,717 A | 3/1999 | DiMarzio | |
| 5,892,583 A | 4/1999 | Li | |
| 5,905,572 A | 5/1999 | Li | |
| 5,920,390 A | 7/1999 | Farahi | |
| 5,921,926 A | 7/1999 | Rolland | |
| 5,943,133 A | 8/1999 | Zeylikovich | |
| 5,956,355 A | 9/1999 | Swanson | |
| 5,962,852 A | 10/1999 | Knuettel et al. | |
| 5,991,697 A | 11/1999 | Nelson | |
| 5,994,690 A | 11/1999 | Kulkarni | |
| 6,002,480 A | 12/1999 | Izatt | |
| 6,006,128 A | 12/1999 | Izatt | |
| 6,014,214 A | 1/2000 | Li | |
| 6,015,969 A | 1/2000 | Nathel et al. | |
| 6,020,963 A | 2/2000 | DiMarzio | |
| 6,037,579 A | 3/2000 | Chan | |
| 6,053,613 A | 4/2000 | Wei | |
| 6,057,920 A | 5/2000 | Fercher | |
| 6,069,698 A | 5/2000 | Ozawa | |
| 6,072,765 A | 6/2000 | Rolland | |
| 6,111,645 A | 8/2000 | Tearney | |
| 6,124,930 A | 9/2000 | Fercher | |
| 6,134,003 A | 10/2000 | Tearney | |
| 6,141,577 A | 10/2000 | Rolland | |
| 6,144,449 A | 11/2000 | Knuettel | |
| 6,152,875 A | 11/2000 | Hakamata | |
| 6,160,826 A | 12/2000 | Swanson | |
| 6,175,669 B1 * | 1/2001 | Colston et al. | 385/12 |
| 6,191,862 B1 | 2/2001 | Swanson | |
| 6,198,540 B1 | 3/2001 | Ueda | |
| 6,201,608 B1 | 3/2001 | Mandella | |
| 6,208,415 B1 | 3/2001 | DeBoer et al. | |
| 6,219,055 B1 | 4/2001 | Bhargava | |
| 6,226,089 B1 | 5/2001 | Hakamata | |
| 6,233,055 B1 | 5/2001 | Mandella | |
| 6,252,666 B1 | 6/2001 | Mandella | |
| 6,268,921 B1 | 7/2001 | Seitz | |
| 6,282,011 B1 | 8/2001 | Tearney | |
| 6,288,784 B1 | 9/2001 | Hitzenberger | |
| 6,304,373 B1 | 10/2001 | Zavislan | |
| 6,307,633 B1 | 10/2001 | Mandella | |
| 6,307,634 B2 | 10/2001 | Hitzenberger | |
| 6,330,063 B1 | 12/2001 | Knuettel | |
| 6,351,325 B1 | 2/2002 | Mandella | |
| 6,370,422 B1 | 4/2002 | Richards-Kortum | |
| 6,377,349 B1 | 4/2002 | Fercher | |
| 6,381,015 B1 | 4/2002 | Sonehara | |
| 6,381,025 B1 | 4/2002 | Bornhop | |
| 6,381,490 B1 | 4/2002 | Ostrovsky | |
| 6,384,915 B1 | 5/2002 | Everett et al. | 356/336 |
| 6,385,358 B1 | 5/2002 | Everett | |
| 6,390,978 B1 | 5/2002 | Irion | |
| 6,407,872 B1 | 6/2002 | Lai | |
| 6,419,360 B1 | 7/2002 | Hauger | |
| 6,421,164 B2 | 7/2002 | Tearney | |
| 6,423,956 B1 | 7/2002 | Mandella | |
| 6,430,455 B1 | 8/2002 | Rebello | |
| 6,437,867 B2 | 8/2002 | Zeylikovich | |
| 6,441,356 B1 | 8/2002 | Mandella | |
| 6,445,939 B1 | 9/2002 | Swanson | |
| 6,445,944 B1 | 9/2002 | Ostrovsky | |
| 6,456,769 B1 | 9/2002 | Furusawa | |
| 6,466,713 B2 | 10/2002 | Everett | |
| 6,469,489 B1 | 10/2002 | Bourquin | |
| 6,477,403 B1 | 11/2002 | Eguchi | |
| 6,485,413 B1 | 11/2002 | Boppart | |
| 6,496,267 B1 | 12/2002 | Takaoka | |
| 6,498,948 B1 | 12/2002 | Ozawa | |
| 6,501,551 B1 | 12/2002 | Tearney | |
| 6,507,747 B1 | 1/2003 | Gowda | |
| 6,519,076 B2 | 2/2003 | Fisher | |
| 6,522,913 B2 | 2/2003 | Swanson | |
| 6,525,862 B2 | 2/2003 | Fisher | |
| 6,527,708 B1 | 3/2003 | Nakamura | |
| 6,538,817 B1 | 3/2003 | Farmer | |
| 6,546,272 B1 | 4/2003 | MacKinnon | |
| 6,549,801 B1 | 4/2003 | Chen | |
| 6,552,796 B2 | 4/2003 | Magnin | |
| 6,564,087 B1 | 5/2003 | Pitris | |
| 6,564,089 B2 | 5/2003 | Izatt | |
| 6,570,659 B2 | 5/2003 | Schmitt | |
| 6,571,117 B1 | 5/2003 | Marbach | |
| 6,577,394 B1 | 6/2003 | Zavislan | |
| 6,615,071 B1 | 9/2003 | Casscells | |
| 6,701,181 B2 | 3/2004 | Tang | |
| 2001/0047137 A1 | 11/2001 | Moreno | |
| 2003/0002046 A1 * | 1/2003 | Myers et al. | 356/459 |
| 2003/0023152 A1 | 1/2003 | Abbink | |
| 2003/0023170 A1 | 1/2003 | Gardner et al. | |
| 2003/0028100 A1 | 2/2003 | Tearney | |
| 2003/0055307 A1 | 3/2003 | Elmaleh | |
| 2003/0076508 A1 | 4/2003 | Cornsweet | |
| 2003/0112444 A1 | 6/2003 | Yang et al. | |
| 2003/0137669 A1 | 7/2003 | Rollins et al. | |
| 2003/0171691 A1 | 9/2003 | Casscella | |
| 2004/0218189 A1 | 11/2004 | Izatt et al. | |
| 2005/0004453 A1 | 1/2005 | Tearney et al. | |
| 2005/0254058 A1 | 11/2005 | Alphonse | |

FOREIGN PATENT DOCUMENTS

| | | |
|---|---|---|
| EP | 0831312 A1 | 3/1998 |
| EP | 0831312 B1 | 10/2001 |
| EP | 1071370 | 1/2006 |
| WO | WO 92/19930 | 11/1992 |
| WO | WO 97/132182 | 9/1997 |
| WO | WO9932897 A2 | 7/1999 |
| WO | WO9957507 A1 | 11/1999 |
| WO | WO0012060 A2 | 3/2000 |
| WO | WO0280767 A1 | 3/2002 |
| WO | WO03010510 A2 | 2/2003 |
| WO | WO03088817 A2 | 10/2003 |
| WO | WO2005/114094 A1 | 12/2005 |

OTHER PUBLICATIONS

PCT International Search Report PCT/US2005/015373 Apr. 5, 2005.
PCT International Search Report PCT/US2005/015558 Apr. 5, 2005.
PCT International Search Report PCT/US2005/015372 Apr. 5, 2005.
PCT International Search Report/US2006/002244.
G. Popescu, C. Mjufat, A. Dogariu, Evidence of Scattering Anisotropy Effects on Boundary Conditions of the Diffusion Equation; Phys. Rev. E; Eol. 61; 2000; pp. 4523-4529.
A. Smith, D. Yang, H. Delcher,. J. Eppstein, D. Williams, and S. Wilkes, Fluorescein kinetics in Interstitial Fluid Harvested from Diabetic Skin During Fluorescein Angiography: Implications for Glucose Monitoring; Diabetes Technology & Therapeutics vol. 1(1); 1999; pp. 21-27.
G. Popescu, and A. Dogariu, Optical Path-Length Spectroscopy of Wave Propagation in Random Media; Optic Letters; vol. 24(7); Apr. 1, 1999; pp. 442-444.
A. Dunn and R. Richards-Kortum, Three-dimensional Computation of Light Scattering from Cells; IEEE Journal of Selected Topics in Quantum Electronics; vol. 2; No. 4; Dec. 1996.

F. A. Duck, Physical Properties of Tissue; Academic; Longon; 1990.

W.F. Cheong, S.A. Prahl, and A.J. Welsh, A Review of the Optical Properties of Biological Tissues; IEEE Journal of Quantum Electronics; vol. 26; 1990; pp. 2166-2185.

M.J. C. van Gemert, S.L. Jacques, H.J.C.M. Sterenbord, and W.M. Star, Skin Optics; IEEE Transactions on Biomedical Engineering; vol. 36(12); 1989; 99. 1146-1154.

J.J. Duderstadt, and L. J. Hamilton. Nuclear Reactor Analysis: Wiley: New York: 1976: pp. 133-138.

D.J. Durian, Influence of the Boundary Reflection and Refraction on Diffusive Photon Transport; Phys. Rev. E; vol. 50; 1994; pp. 442-444.

J.X. Zhu, D.J. Pine, and D.A. Weitz, Internal Reflection of Diffusive Light in Random Media; Physical Review A; vol. 44; 1991; pp. 3948-3959.

M.S. Patterson, B. Chance, and B.C. Wilson, Time Resolved Reflectance and Transmittance for the Non-invasive Measurement of Tissue Optical Properties; Applied Optics; vol. 28(12); 1989; pp. 2331-2336.

V. N. Vapnik, Statistical Learning Theory; John Wiley & Sons, 1998, pp. 19-51.

W.H. Press et al, Numerical Recipes in C: the Art of Scientific Computing; 2nd Edition; Cambridge University Press; 1992; pp. 394-455.

V. Cherassky; and F. Mulier, Learning from Data; John Wiley & Sons; 1998; pp. 17-21; 38-41; 54; 122.

V. Cherassky, Model Complexity Control and Statistical Learning Theory; Natural Computing; Kluwer; vol. 1; No.; 2002; pp. 1-19.

Joseph M. Schmitt, "Optical Coherence Tomography (OCT): A Review," *IEEE J. Select Topics in Quant.* Elect. vol. 5., No. 4, Jul./Aug. 1999, pp. 1205-1215.

Rinat O. Esenaliev, Kirill V. Larin and Irina V. Larina, "Noninvasive Monitoring of Glucose Concentration with Optical Coherence Tomography," *Optics Lett*. vol. 28, No. 13, Jul. 1, 2001, pp. 992-994.

Kirill V. Larin, Moshen S. Eledrisi, Massoud Motemedi, and Rinat O. Esenaliev, "Noninvasive Blood Glucose Monitoring with Optical Coherence Tomography—A Pilot Study in the Human Subjects," *Diabetes Care*, vol. 25, No. 12, Dec. 2002, pp. 2263-2267.

R.J. McNichols, G.L. Cote, Optical Glucose Sensing in Biological Fluids: An Overview, Journal of Biomedical Optics, vol. 5, 2000, pp. 5.

C. Lentner, ed. Geigy Scientific Tables, Ciba-Geigy, Basle, Switzerland, 1984, pp. 69.

S.L. Jacques, Skin Optics, Oregon Medical Laser Center News, Jan. 1998.

J. M. Schmitt, G. Kumar, Optical Scattering Properties of Soft Tissue: A Discrete Particle Model, *Applied Optics*, vol. 37, No. 13, May 1, 1998, pp. 2788.

Akira Ishimaru, "Diffusion of Light in Turbid Material," *Applied Optics*, vol. 28, No. 12, Jun. 15, 1989, pp. 2210-2215.

Gerard A. Alphonse, "Design of High-Power Superluminescent Diodes with Low Spectral Modulation," *Proceedings of SPIE*, vol. 4648, pp. 125-138 (2002).

Andrew M. Rollins and Joseph A. Izatt, "Optimal Interferometer Designs for Optical Coherence Tomography," *Optics Lett*. vol. 24, No. 21, Nov. 1, 1999, pp. 1484-1486.

H.C. Casey, Jr. and M.B. Panish, *Heterostructure Lasers Parts A and B*, Academic Press, New York, 1978.

R.W. Waynant, V.M. Chenault, Overview of Non-Invasive Fluid Glucose Measurement Using Optical Techniques to Maintain Glucose Control in Diabetes Mellitus, *LEOS Newsletter*, vol. 12, No. 2, Apr. 1998.

A. Dogariu and G. Popescu, "High-Resolution spatial and Spectral Characterization of Optical Fields," *Optics & Photonics News*, Dec. 2002, p. 21.

M. Kohl, M. Cope, M. Essenpries, D. Bocker, "Influence of Glucose Concentration on Light Scattering in Tissue-Simulating Phantoms," *Optics Letters*, vol. 19, No. 2, Dec. 15, 1994, pp. 2170.

J. T. Bruulsema, et al, "Correlation Between Blood Glucose Concentration in Diabetics and Noninvasively Measured Tissue Optical Scattering Coefficient," *Optics Letters*, vol. 22, No. 3, Feb. 1, 1997, pp. 190.

J. M. Schmidt, S.H. Xiang, K.M.Yung, "Speckle in Optical Coherence Tomography" *J. of Biomedical Optics*, vol. 4, No. 1, Jan. 1999, pp. 95-105.

Aristide Dogariu and Gabriel Popsecu, "Measuring the Phase of Spatially Coherent Polychromatic Fields," School of Optics, University of Central Florida, vol. 89, No. 24, Dec. 9, 2002, pp. 1-2.

John S. Maier et al., "In Vivo *Study of Human Tissues with a Portable Near-Infrared Tissue Spectrometer*," http://lfd.uiuc.edu/spie95/jm/jmspie95.html, pp. 1-8.

Valery V. Tuchin, "Light Propagation in Tissues with Controlled Optical Properties," *J. Biomedical Optics* 2(04), 1997, pp. 401-417.

Kirill V. Larin, Massoud Motamedi, Taras V. Ashitkov, and Rinat O. Esenaliev, "Specificity of Noninvasive Blood Glucose Sensing Using Optical Coherence Tomography Technique: A Pilot Study," Physics in Medicine and Biology, Phys. Med. Biol. 48 (2003) pp. 1371-1390.

Sid Bennett and Steven R. Emge, "Fiber Optic Rate Gyro for Land Navigation and Platform Stabilization," Sensors Exp 1994, Cleveland, Ohio, Sep. 20, 1994.

A F. Fercher, K. Mengedoht, and W. Werner, "Eye-Length Measurement By Interferometry with Partially Coherent Light," *Optic Letters*, Optical Society of America, vol. 13 No. 3, Mar. 1988, pp. 186-188.

B.L. Danielson and C.D. Whittenberg, "Guided-wave Reflectometry with Micrometer Resolution," *Applied Optics*, vol. 26, No. 14, Jul. 15, 1987.

Kazumasa Takada, Itaru Yokohama, Kazumori Chida, and Juichi Noda, "New Measurement System for Fault Location in Optical Waveguide Devices Based on an Interferometric Technique," *Applied Optics*, vol. 26, No. 9., May 1, 1987, pp. 1603-1606.

Robert C. Youngquist, Sally Carr and D.E.N. Davies, Optical Coherence-Domain Reflectometry: A New Optical Evaluation Technique, *Optics Letters*, vol. 12, No. 3, Mar. 1987.

Harry Delcher, "Continuous Measurement of Glucose in Interstitial Fluid for Extended Time Periods," SpectRx Inc., pp. 1-8.

Optical Coherence tomography—principles and applications, by A.F. Fercher, W. Drexler, C.K. Hitzenberger and T. Lasser, Institute of Physics Publishing, Reports on Progress in Physics, Jan. 20, 2003, pp. 239-303.

Low Coherence Interferometric Fibre Multiplex Sensor Systems Using an Integrated Optical Configuration, by A.J. Rogers, M.J. Plissi, Department of Electronic and Electrical Engineering, King's College London, UK Spie vol. 2510 XP-002112588.

Integrated Optic Error Detecting Circuit Using Ti-Linbo3 Interferometric Light Modulators by Hiroshi Haga, Masato Ohta, Masayuki Izutsu and Tadasi Sueta Faculty of Engineering Science, Osaka University Toyonaka, Osaka 560, Japan IOOOC_ECOC '85.

Recent progress in fibre optic low-coherence interferometry by Yun-Jiang Rao and David A. Jackson Applied Optics Group, Physics Dept., University of Kent at Canterbury, Kent CT2 7NR, UK Meas. Sci. Technol. 7 (1996) pp. 981-999.

Aryan Vink, "Atherosclerotic Plaques: How Vulnerable is the Definition of the Vulnerable Plaque"? Journal of Interventional Cardiology, vol. 16, No. 2, 2003, pp. 115-122.

Renu Virami, M.D., "Pathology of the Thin-Cap Fibroatheroma: A Type of Vulnerable Plaque," Journal of Interventional Cardiology, vol. 16, No. 3, 2003, pp. 267-272.

Morteza Naghavi MD, "From Vulnerable Plaque to Vulnerable Patient," Circulation, Oct. 7, 2003, pp. 1664-1672.

Renu Virami, "Lessons from Sudden Coronary Death," Arterioscler Thromb Biol., May 2000, pp. 1262-1275.

International Search Report, PCT/US2007/012146, Feb. 19, 2008.

\* cited by examiner

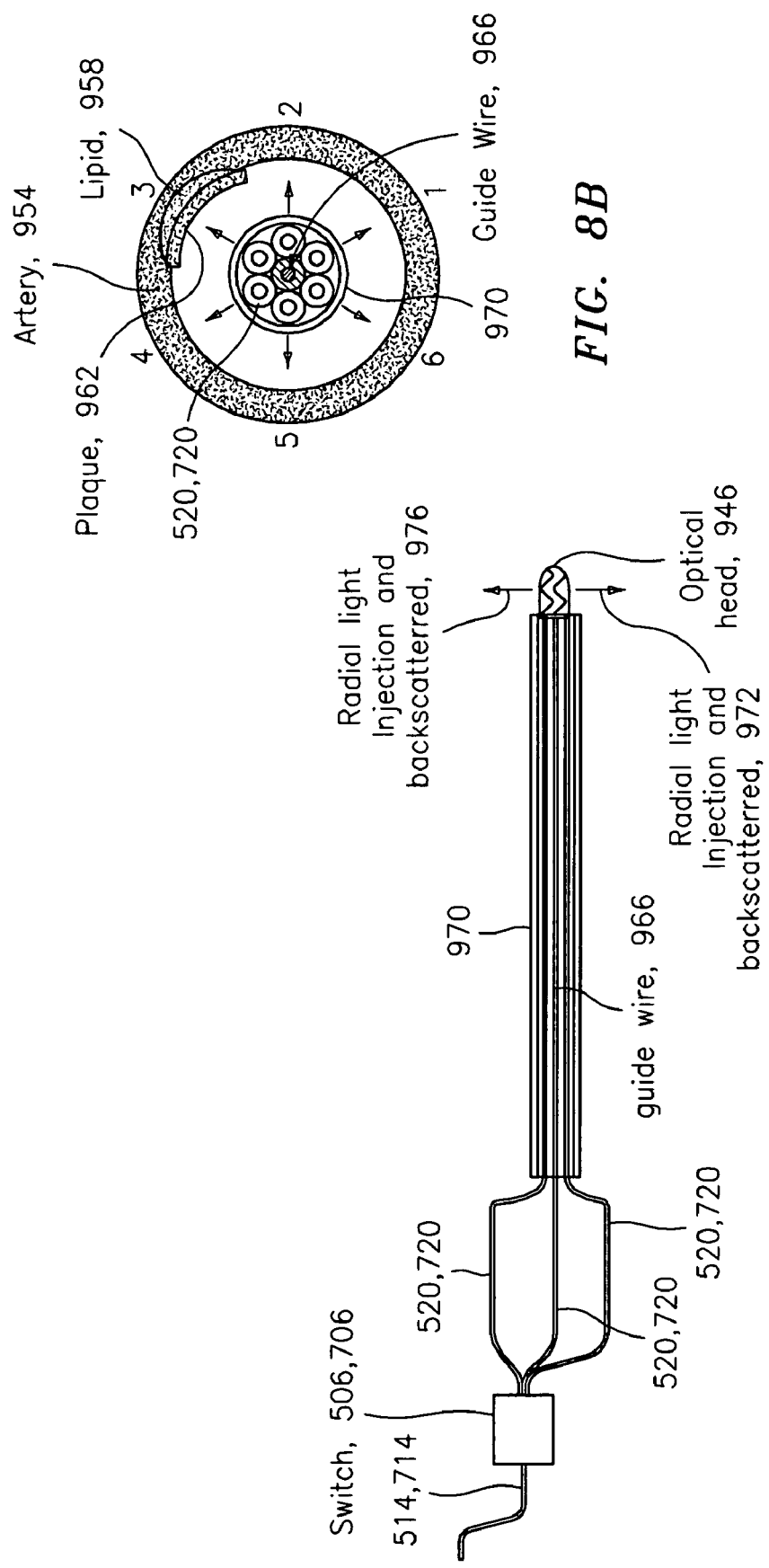

MULTI-CHANNEL LOW COHERENCE INTERFEROMETER

BACKGROUND OF THE INVENTION

The present invention relates generally to the field of interferometry, and, more specifically, to an interferometric system employing an optical switch configuration defining a plurality of probe arms.

In various fields of medicine and engineering it is often necessary to inspect surfaces that are difficult to reach. For example engine cylinders, compressors for jet aircraft engines, heat exchangers, internal organs, cavities, and arterial passageways in a patient. Biomedical imaging technology, for example, magnetic resonance imaging, X-ray computed tomography, ultrasound, and confocal microscopy could be used to inspect and characterize a variety of tissues and organs. However, there are many situations where existing biomedical diagnostics are not adequate. This is particularly true where high resolution, about 1 micron, imaging is required. Resolution at this level often requires biopsy and histopathologic examination. While such examinations are among the most powerful medical diagnostic techniques, they are invasive and can be time consuming and costly. Furthermore, in many situations conventional excisional biopsy is not possible. Coronary artery disease, a leading cause of morbidity and mortality, is one important example of a disease where conventional diagnostic excisional biopsy cannot be performed. There are many other examples where biopsy cannot be performed or conventional imaging techniques lack the sensitivity and resolution for definitive diagnosis.

A borescope is an optical device such as a prism or optical fiber that can be used to inspect inaccessible spaces. An endoscope is an instrument for visualizing the interior of a hollow organ like a colon or esophagus. The observed part of the internal surface is illuminated by an illumination channel and the optical observation system allows investigation of the internal space surface. During inspection it is often advantageous and important to investigate lateral surface in the space.

Elements allowing a change in the direction of optical observation permits inspection inside spaces and lateral surfaces that a rigid borescope or endoscope cannot view. Endoscopes and borescopes have included a means of articulating the tip of the scope so that it bends in several directions to look around a cavity. However, in many applications, for example arteries, there is insufficient room in the cavity or conduit for articulation of the scope tip.

Rather than being flexible, a rigid endoscope contains a mount, an optical system for observation, and a light guide. The mount and the light guide are placed in a tube housing. The optical axes of the observation and illumination system for lateral direction are deflected at an angle with respect to the lens optical axis with the help of a prism. In order to observe the entire lateral surface along the whole transverse perimeter of the investigated cavity, it is necessary to rotate the entire endoscope housing around the axis of symmetry. Fiber optic inspection devices contain a lens in a mount and illumination lamps installed in a housing at a lateral wall of the housing where a window is provided. Lateral observation is performed by way of a reflection prism situated opposite the window. For panoramic observation of the walls in a space the entire housing needs to be rotated. In some instruments the illumination source must also be rotated complicating the design and operation of such a device.

Current methods for screening and diagnosis of pathologic conditions in tissue such as cancer often involve surgical biopsy of the tissue followed by histological evaluation. This procedure is not only invasive, time-consuming and expensive but often is not capable of rapid and reliable screening of a large surface such as the colon, esophagus, or stomach. Since early diagnosis and treatment tend to be critical to effective and successful treatment of these pathologies, the development of better techniques and devices for diagnosis and screening would result in improved clinical outcomes.

Optical coherence tomography (OCT) is an imaging technique, which allows high-resolution observation and characterization of tissue microstructure imaging with resolution on the order of microns. This technique measures detailed changes within a few millimeters of a non-transparent tissue structure. One drawback of the OCT imaging is the time required to obtain images over a sufficient area.

Optical coherence domain reflectometry ("OCDR") is an optical technique that uses a scanning Michelson interferometer in conjunction with a broadband illuminating source and cross-correlation detection.

Both OCDR and OCT use optical data collected by a single mode optical fiber to determine the morphology, physical properties and location of various types of interspersed materials or biological tissue. Typically a probe used in conjunction with either OCDR and OCT includes an optical fiber having a head at its distal tip. Alternatively, inserting an optical fiber concentrically into a thin-wall flexible hypodermic stainless-steel tube and fastening it with cement form the probe. A window in the tube allows light to pass to and from the head at the tip of the optical fiber. The probe is then inserted into the tissue or organ to be examined. Light emitted by the head of the optical fiber is reflected from the adjacent body of tissue or organ. The head then collects the reflected light, also known as "back-scattered" light.

Using a Michelson interferometer in conjunction with this apparatus the morphology, properties, and location of the various materials, tissue, or organ elements that caused the back-scattered light are determined and an image generated to provide a real-time visual display of the device, body of tissue, or organ being examined.

However, as a typical optical fiber can only emit light and gather back-scattered light along its axial centerline, it is limited to viewing straight ahead. A view transverse to the axial centerline of the fiber has been obtained by turning or bending the head of the fiber perpendicular to its axial centerline, and this is often very difficult or even impossible in the close confines typically encountered during surgical procedures, or in examining the sides of an artery or vein.

Mounting a gradient refractive index lens or a mirrored corner cube on the head of the optical fiber has been used to obtain lateral scans. Either a gradient refractive index (GRIN) lens or a mirrored corner cube deflect the emitted light at an angle transverse to the axial centerline of the optical fiber, and thus provide for lateral viewing. However, these apparatus add bulk to the head of the optical fiber. For example, the diameter of an optical fiber typically used in conjunction with OCDR and OCT is on the order of about 90 microns, while the diameter of the smallest GRIN lens is about 150 microns and that of the smallest mirrored corner cube is about 125 microns. The use of either of the aforementioned optical devices thus renders some locations inaccessible and makes the optical fiber more difficult to maneuver. In addition, extremely small GRIN lenses and mirrored corner cubes are quite expensive, and very fragile. Their use thus adds to the cost of the probe, and renders it prone to malfunction.

SUMMARY OF THE INVENTION

A system for determining a characteristic of a sample in accordance with an embodiment of the invention is presented. The system includes a splitter receptive to a light from a light source to produce a sensing light portion and a reference light portion. A sensing light path is provided and includes a light path configured to communicate the sensing light portion from the splitter and the sensing light portion reflected from the sample, a plurality of probe light paths configured to direct the sensing light portion at the sample and to receive the sensing light portion reflected from the sample, and an optical switch selectable to define communication between the light path and a selected at least one of the probe light paths. A reference light path is also provided and is configured to communicate the reference light portion from the splitter. The reference light path is further configured to direct the reference light portion at a reflecting device and to receive the reference light portion reflected from the reflecting device. The system further includes means for increasing and decreasing the effective light path length of the sensing light path and means for increasing and decreasing the effective light path length of the reference light path. The means for increasing and decreasing the effective light path length of the sensing light path and the means for increasing and decreasing the effective light path length of the reference light path are configured such that when one of the means is increasing the other of the means is decreasing. The means for increasing and decreasing the effective light path length of the sensing light path and the means for increasing and decreasing the effective light path length of said reference light path are increased and decreased to obtain an effective light path length difference between the effective light path lengths of the sensing light path and the reference light path within about a coherence length of the light. The system further includes a detector receptive to the sensing light portion reflected from the sample and the reference light portion reflected from the reflecting device. The detector generating a signal indicative of an interference of the sensing light portion reflected from the sample and the reference light portion reflected from the reflecting device. The system still further includes processing means configured to determine a characteristic of the sample from the signal indicative of the interference of the sensing light portion reflected from the sample and the reference light portion reflected from the reflecting device.

A system for determining a characteristic of a sample in accordance with another embodiment of the invention is presented. The system includes a splitter receptive to a light from a light source to produce a sensing light portion and a reference light portion. A sensing light path is provided and includes a light path configured to communicate the sensing light portion from the splitter and the sensing light portion reflected from the sample, a plurality of probe light paths configured to direct the sensing light portion at the sample and to receive the sensing light portion reflected from the sample, and a plurality of switches arranged in a multi-level configuration. The optical switches are selectable to define communication between the light path and a selected at least one of the probe light paths. A reference light path is also provided and is configured to communicate the reference light portion from said splitter. The reference light path is further configured to direct the reference light portion at a reflecting device and to receive the reference light portion reflected from the reflecting device. The system further includes means for generating an interference condition between the sensing light portion reflected from the sample and the reference light portion reflected from the reflecting device. The system still further includes a detector receptive to the sensing light portion reflected from the sample and the reference light portion reflected from the reflecting device. The detector generating a signal indicative of an interference of the sensing light portion reflected from the sample and the reference light portion reflected from the reflecting device. The system also includes processing means configured to determine a characteristic of the sample from the signal indicative of the interference of the sensing light portion reflected from the sample and the reference light portion reflected from the reflecting device.

A system for determining a characteristic of a sample in accordance with yet another embodiment of the invention is presented. The system includes a splitter receptive to a light from a light source to produce a sensing light portion and a reference light portion. A sensing light path is provided and includes a light path configured to communicate the sensing light portion from the splitter and the sensing light portion reflected from the sample, a plurality of probe light paths configured to direct the sensing light portion at the sample and to receive the sensing light portion reflected from the sample, and an optical switch selectable to define communication between the light path and a selected at least one of the probe light paths. A reference light path is also provided and is configured to communicate the reference light portion from the splitter. The reference light path is further configured to direct the reference light portion at a reflecting device and to receive said reference light portion reflected from the reflecting device. The system further includes means for generating an interference condition between the reference light portion reflected from the reflecting device and the sensing light portion reflected from the sample. The system still further includes a detector receptive to the reference light portion reflected from the reflecting device and the sensing light portion reflected from the sample. The detector generating a signal indicative of an interference of the reference light portion reflected from the reflecting device and the sensing light portion reflected from the sample. The system includes a first circulator disposed in the reference light path to transfer the reference light portion from the splitter to the reflecting device, and to transfer the reference light portion reflected from the reflecting device to the detector. The system also includes a second circulator disposed in the sensing light path to transfer the sensing light portion from the splitter to the optical switch, and to transfer the sensing light portion reflected from the sample to the detector. The system further includes a coupler receptive to the reference light portion reflected from the reflecting device and transferred by the first circulator. The coupler is also receptive to the sensing light portion reflected from the sample and transferred by the second circulator. The coupler presents the reference light portion reflected from the reflecting device and the sensing light portion reflected from the sample to the detector. The system also includes processing means configured to determine a characteristic of the sample from the signal indicative of the interference of the reference light portion reflected from the reflecting device and the sensing light portion reflected from the sample.

A system for determining a characteristic of a sample in accordance with another embodiment of the invention is presented. The system includes a splitter receptive to a light from a light source to produce a sensing light portion and a reference light portion. A sensing light path is provided and includes a light path configured to communicate the sensing light portion from the splitter and the sensing light portion reflected from the sample, a plurality of probe light paths configured to direct the sensing light portion at the sample and to receive the sensing light portion reflected from the sample, and an optical switch selectable to define communication between the light path and a selected at least one of the probe light paths. A reference light path is also provided and is configured to communicate the reference light portion from the splitter, said reference light path further configured to direct the reference light portion at a reflecting device and to receive the reference light portion reflected from the reflecting device. The system further includes means for generating an interference condition in a frequency domain between the sensing light portion reflected from the sample and the reference light portion reflected from the reflecting device. The system still further includes a detector receptive to the sensing light portion reflected from the sample and the reference light portion reflected from the reflecting device. The detector generating a signal indicative of an interference of the sensing light portion reflected from the sample and the reference light portion reflected from the reflecting device. The system also includes processing means configured to determine a characteristic of the sample from the signal indicative of the interference of the sensing light portion reflected from the sample and the reference light portion reflected from the reflecting device.

A system for determining a characteristic of a sample in accordance with still another embodiment of the invention is presented. The system includes a splitter receptive to a light from a light source to produce a sensing light portion and a reference light portion. The splitter has an asymmetrical ratio such that the sensing light portion is greater than the reference light portion. A sensing light path is provided and includes a light path configured to communicate the sensing light portion from the splitter and the sensing light portion reflected from the sample, a plurality of probe light paths configured to direct the sensing light portion at the sample and to receive the sensing light portion reflected from the sample, and an optical switch selectable to define communication between the light path and a selected at least one of the probe light paths. A reference light path is also provided and is configured to communicate the reference light portion from the splitter. The reference light path is further configured to direct the reference light portion at a reflecting device and to receive the reference light portion reflected from the reflecting device. The system further includes means for generating an interference condition between the sensing light portion reflected from the sample and the reference light portion reflected from the reflecting device. The system still further includes a detector receptive to the sensing light portion reflected from the sample and the reference light portion reflected from said reflecting device. The detector generating a signal indicative of an interference of the sensing light portion reflected from the sample and the reference light portion reflected from the reflecting device. The system also includes processing means configured to determine a characteristic of the sample from the signal indicative of the interference of the sensing light portion reflected from the sample and the reference light portion reflected from said reflecting device.

A system for determining a characteristic of a sample in accordance with an embodiment of the invention is presented. The system includes a splitter receptive to a light from a light source to produce a sensing light portion and a reference light portion. A sensing light path is provided and includes a light path configured to communicate the sensing light portion from the splitter and the sensing light portion reflected from the sample, a plurality of probe light paths configured to direct the sensing light portion at the sample and to receive the sensing light portion reflected from the sample, and an optical switch selectable to define communication between the light path and a selected at least one of the probe light paths. A reference light path is also provided and is configured to communicate the reference light portion from the splitter. The reference light path is further configured to direct the reference light portion at a reflecting device and to receive the reference light portion reflected from the reflecting device. The system further includes a variable optical attenuator disposed in the reference light path to attenuate the reference light portion. The system still further includes means for generating an interference condition between the sensing light portion reflected from the sample and the reference light portion reflected from the reflecting device. The system includes a detector receptive to the sensing light portion reflected from the sample and the reference light portion reflected from the reflecting device. The detector generating a signal indicative of an interference of the sensing light portion reflected from the sample and the reference light portion reflected from the reflecting device. The system also includes processing means configured to determine a characteristic of the sample from the signal indicative of the interference of the sensing light portion reflected from the sample and the reference light portion reflected from said reflecting device.

A method for determining a characteristic of a sample in accordance with an embodiment of the invention is presented. The method includes asymmetrically splitting a light from a light source into a sensing light portion and a reference light portion, such that the sensing light portion is greater than the reference light portion. The method further includes selecting a probe light path from a plurality of probe light paths. The probe light paths form a portion of a sensing light path. The method still further includes directing the sensing light portion by means of the sensing light path, including the selected at least one of the probe light paths, at the sample. The method includes receiving the sensing light portion reflected from the sample by means of the sensing light path, including the selected at least one of said probe light paths. The method also includes directing the reference light portion by means of a reference light path at a reflecting device. The method includes receiving the reference light portion reflected from the reflecting device by means of the reference light path. The method further includes generating an interference condition between the sensing light portion reflected from the sample and the reference light portion reflected from said reflecting device. The method still further includes detecting the sensing light portion reflected from the sample and the reference light portion reflected from the reflecting device, to generate a signal indicative of an interference of the sensing light portion reflected from the sample and the reference light portion reflected from the reflecting device. The method also includes determining a characteristic of the sample from the signal indicative of the interference of the sensing light portion reflected from the sample and the reference light portion reflected from the reflecting device.

A method for determining a characteristic of a sample in accordance with another embodiment of the invention is presented. The method includes splitting a light from a light source into a sensing light portion and a reference light portion. The method further includes selecting a probe light path from a plurality of probe light paths. The probe light paths form a portion of a sensing light path. The method still further includes directing the sensing light portion by means of the sensing light path, including the selected at least one of the probe light paths, at the sample. The method includes receiving the sensing light portion reflected from the sample by means of the sensing light path, including the selected at least one of the probe light paths. The method also includes directing the reference light portion by means of a reference light path at a reflecting device. The method includes receiving the reference light portion reflected from the reflecting device by means of the reference light path. The method further includes generating an interference condition in a frequency domain between the sensing light portion reflected from the sample and the reference light portion reflected from the reflecting device. The method still further includes detecting the sensing light portion reflected from the sample and the reference light portion reflected from the reflecting device, to generate a signal indicative of an interference of the sensing light portion reflected from the sample and the reference light portion reflected from the reflecting device. The method also includes determining a characteristic of the sample from the signal indicative of the interference of the sensing light portion reflected from the sample and the reference light portion reflected from the reflecting device.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 8A is a diagrammatic side view a portion of the interferometer of FIG. 5 utilizing a catheter configuration, and FIG. 8B is a cross section view of the catheter configuration of FIG. 8A disposed in an artery.

DESCRIPTION OF THE PREFERRED EMBODIMENT

Figure 1:
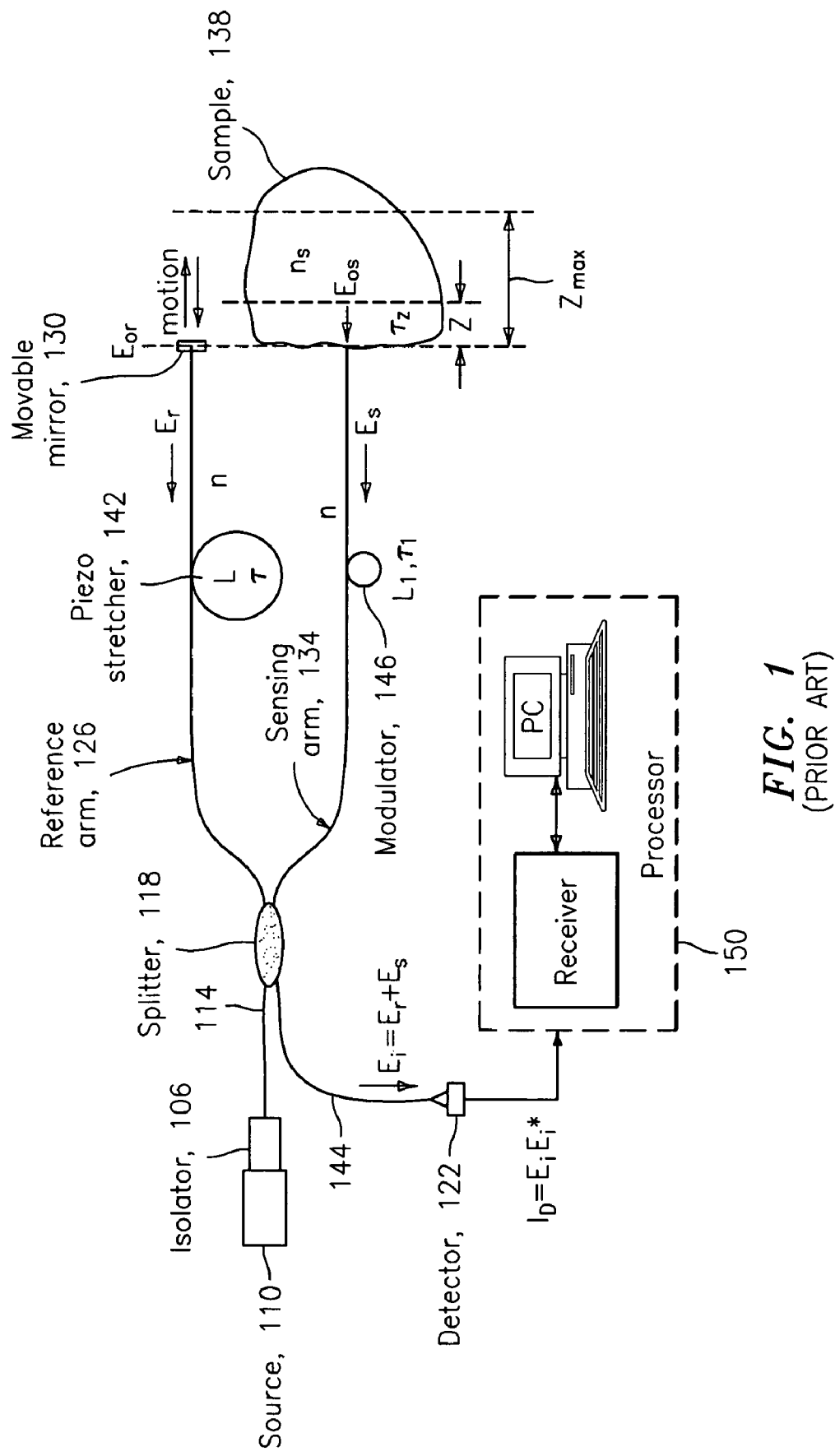
FIG. 1 is a schematic diagram of an all fiber Michelson low coherence interferometer in accordance with the prior art.

Before exemplary embodiments of the invention are described, it is to be understood that this invention is not limited to the particular embodiments described. It is also to be understood that the terminology used in the description is for the purpose of describing the particular embodiments only, and is not intended to limit the scope of the invention which will be limited only by the claims.

It must also be noted that as used herein and in the claims, the singular forms "a", "an", and "the" include plural reference unless the context clearly dictates otherwise. Thus, for example, reference to a "delay" is a reference to one or more optical delays and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the invention, the preferred methods, devices, and materials are now described. All publications mentioned herein are incorporated by reference. Nothing herein is to be construed as an admission that the invention is not entitled to antedate such disclosure by virtue of prior invention.

"Optional" or "optionally" means that the subsequently described structure, event or circumstance may or may not occur, and that the description includes instances where the event occurs and instances where it does not.

Embodiments of the present invention include devices that have sensing and reference arms, at least one of which has variable delay. The sensing arm including an optical switch for connecting to two or more probe arms. The distal ends of the probe arms collect source light backscattered from a sample. The backscattered light collected by the distal end of a probe arm is combined with reference light and a low coherence interferometric (LCI) signal is produced by a sweep of a variable delay of the device. The interference signal produced by the interaction of reference and sensing light at a detector measures backscattered light. The devices of the present invention may be used to characterize a material based on the interference between reference light and sensing light backscattered (or reflected) from the sample. The low coherence interferometric signals can provide information about the morphology, physical nature, composition, and properties of the sample. The device may be used to discriminate between finished surfaces and corroded surfaces, healthy and diseased tissue, and can sample the material or tissue in two or more areas. Versions of the invention include devices that are interferometers and or autocorrelators.

A reference arm is described herein as comprised of optical fiber, but may be comprised of any structure, such as, waveguides, free space structures, or combinations thereof. A reflector is disposed at the distal end of the reference arm. A delay compensator is an interferometer structure that can include waveguides, optical fibers and reflectors that compensate for the separation of the reference and backscattered light from a sample that is outside the coherence length of the source.

A sample arm is also described herein as comprised of optical fiber, but may be comprised of any structure, such as, waveguides, optical fibers, free space structures, or combinations thereof that propagate low coherence source light to a sample and collect backscattered source light from the sample. Each probe arm defines a portion of the sample arm where the fiber carries sensing light to the sample and collect backscattered sensing light from the sample.

A processor can provide an output, for example but not limited to a digital, current, voltage or combination of these, which is proportional to the interference measured and includes phase, amplitude, or a combinations these.

Referring now to FIG. 1, an ordinary single-arm low-coherence Michelson interferometer using single-mode or polarization-maintaining optical fibers is generally shown. The low-coherence Michelson interferometer is shown as an all-fiber low-coherence Michelson interferometer. This interferometer consists of a broadband light source 110, such as a superluminescent diode (SLD); an optical isolator 106 coupled to a fiber 114, a fiber splitter 118 (having a ratio of 50:50), an optical detector 122, and two arms 126 and 134. Arm 126 is referred to as the reference arm, which has an adjustable length (L) by way of a piezoelectric (PZT) stretcher 142 with a mirror 130 at its end and carries the reference light $E_r$. Arm 134 is referred to as the sensing arm, which allows light to penetrate to a distance (z) in a medium, object, or sample 138, and captures the reflected or back-scattered light $E_s$ from the sample 138. The Variable length L of the reference arm corresponds a time delay τ undergone by $E_r$. Different path lengths for light interacting with the sample may be probed by the interferometric sensor through adjustment of the physical length, optical length, or optical delay of the reference arm of the interferometer. Interference between the reference arm and sample arm light occurs when the optical path length between the two is within the coherence length of the source light. Either moving the mirror 130 at the end of the reference arm or stretching the fiber can provide this length or delay. This stretching is achieved by the PZT stretcher 142 comprising winding part of the fiber around a PZT drum to which a voltage is applied. The PZT stretcher 142 has the advantage of using no mechanical moving parts, and therefore can be relatively fast. By applying a voltage ramp to the PZT stretcher 142, the length is changed or scanned over a given range to provide path length matching with the light from within the sample under study. For biological tissues, which are highly scattering, the maximum depth $z_{max}$ for penetration of light in the sample is of the order of 1-2 millimeters (mm), and a scan can be used. A 40-meter length of fiber wound around a PZT drum can provide an optical path length, nL of 5 mm, where n is the effective refractive index of the fiber, with the application of a peak voltage of about 540 volts in a 5 millisecond ramp to provide a scanning rate of about 1000 mm/s (millimeter per second). For scanning over broad ranges, mechanical scanning with the moving mirror 130 is used, to provide a scanning rate of about 40 mm/s. A similar but shorter delay length $L_1$ or time delay $\tau_1$ is applied to the sensing arm, by a modulator 146, in much the same fashion.

In operation, light, electric field $E_r$, reflected from the reference mirror 130 and the light, electric field $E_s$, reflected or scattered from depth z within the object or sample 138 under study are combined at the detector 122, whose output current, $I_D$ is proportional to the squared magnitude $E_t E_t^*$ of the total electric field $E_t$, which is the sum of $E_r$ and $E_s$, which is time-averaged and integrated over all frequency components of the light source.

The result of the detection process is an electric current of the form (assuming a quantum efficiency of 1 ampere per watt):

$$I_d = I_r + I_s + i_s(z) \tag{1}$$

where $I_r = E_r E_r^*$ is the dc current caused by the reference light, $I_s = E_s E_s^*$ is the dc current caused by the total light in the sensing arm, and $i_s(z)$ is the signal resulting from the interference of the reference and sensing light (* represents the complex conjugate of the field). For a broadband light source with a Gaussian profile, with the reference path length changing as a ramp in the form $\Delta L = \Delta L_0 + vt - n_s z$, then $i_s(z)$ is given by:

$$i_s(z) = S(z)\sqrt{I_r I_s} \exp\left[-\left(\frac{\Delta L_o - n_s z}{L_c}\right)^2\right] \cos\left(\frac{2\pi vt}{\lambda_o}\phi(z)\right) \tag{2}$$

Figure 2:
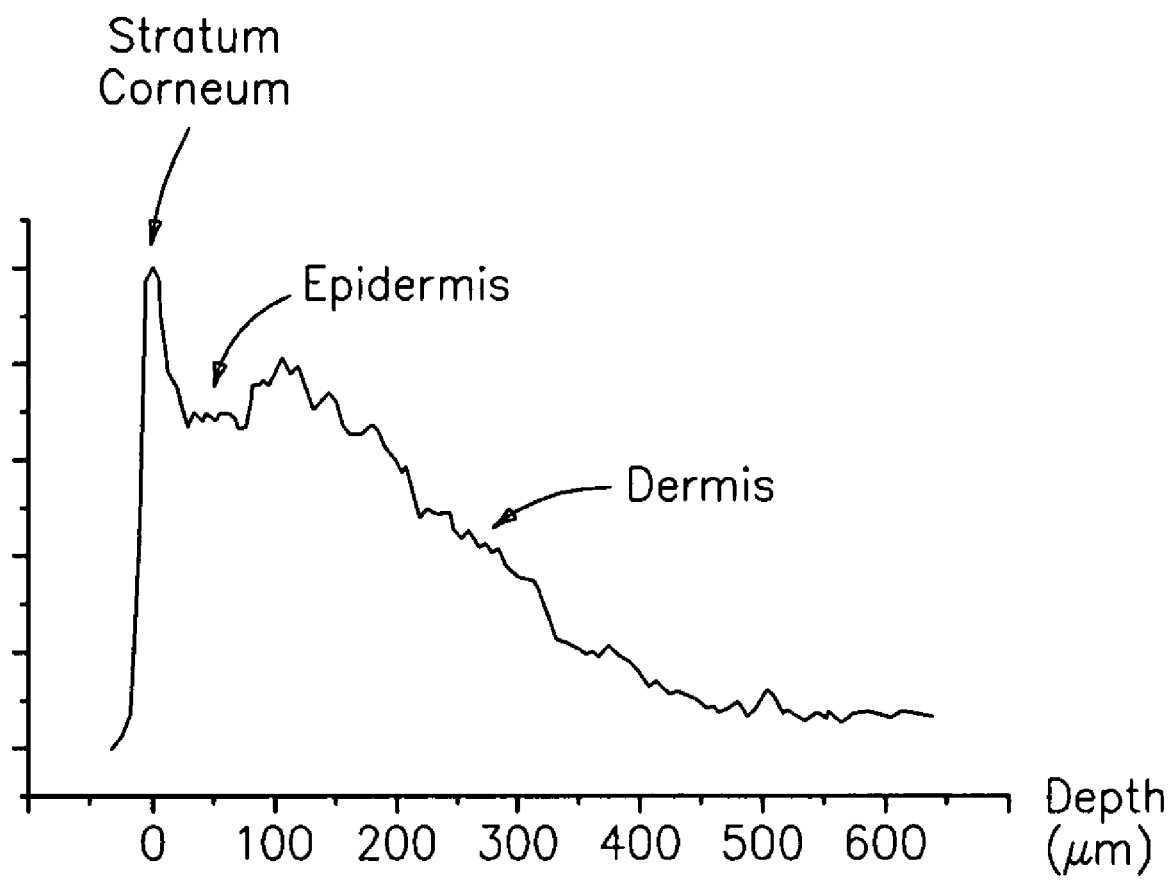
FIG. 2 is a plot of depth dependence of the sensing signal of the interferometer of FIG. 1 for a skin tissue sample.

-continued $$\text{where } L_c = \frac{2\sqrt{\ln 2}}{\pi}\frac{\lambda_o^2}{\Delta\lambda} \approx 0.44\frac{\lambda_o^2}{\Delta\lambda} \tag{3}$$

is the so-called coherence length of the light source having a full-width-half-maximum (FWHM) bandwidth of Δλ, where φ(z) is a phase variable, and where S(z) is a coefficient representing the amount of scattered light collected from distance z by the sensing arm. This is a sinusoidal signal of frequency $f = v/\lambda_o$, called Doppler frequency, with an envelope given by the exponential function. This function has a peak given by:

$$I_s(z)_{peak} = S(z)\sqrt{I_r I_s} \tag{4}$$

which occurs when $\Delta L_o - n_s z = 0$ and $\phi(z) = 0$. An ordinary amplitude demodulator regardless of the value of the Doppler frequency easily detects this peak. This can be computed by a processor 150 (comprising a receiver and a computer), which is connected to the detector 122. As the reference path length is changed, this function gives a profile of the scattering signal, and it is illustrated in FIG. 2, which is a plot of $I_s(z)$ for a skin sample. This type of profile is predicted by scattering theory in general. The specific profile depends on the type of medium or tissue being examined. For scattering media, the value of S(z) is very small, typically below $10^{-4}$ and decreasing exponentially with distance. One of the main features of low-coherence interferometry (LCI), as applied to scattering tissues, is to experimentally obtain this profile for arbitrary tissues, whether the tissue is the dermis (as for determining features such as glucose concentration), or arterial walls (as for the detection of vulnerable plaques).

It will be appreciated that the detection sensitivity of the current represented by Equation 4 is limited by fluctuation noise. The minimum detectable signal is reached when the power it contains is equal to the noise power, i.e., when the signal-to-noise ratio (SNR) is equal to unity. The noise power is expressed in terms of the photocurrent variance $\sigma_i^2$ and it consists of the receiver noise $\sigma_r^2$, the photon shot noise $\sigma_s^2$, and for the case of a broad band source, the excess photon or relative intensity noise (RIN) $\sigma_e^2$, i.e., total noise power is $$\sigma_i^2 = \sigma_r^2 + R\sigma_s^2 + R\sigma_e^2 \tag{5}$$

where R is the input resistance of the receiver. Then the SNR is given by $$SNR = \frac{R I_s^2(z)_{rms}}{\sigma_i^2}, \tag{6}$$

$$\text{where } I_s(z)_{rms} = \frac{I_s(z)_{peak}}{\sqrt{2}}.$$

The receiver noise power is simply the thermal noise due to the input resistance of the receiver. It is given by $\sigma_r^2 = 4kTB$, where k is Boltzmann's constant (k=1.38×10$^{-23}$ J/° K), T is the absolute temperature, and B is the bandwidth of the measurement. For a 1-KHz system at room temperature (T=296° K), its value is 1.66×10$^{-17}$ W.

The shot noise, or the noise due to the random arrivals of the photons on the detector from a monochromatic source, obeys Poisson statistics. It is given by $\sigma_s^2 = 2eI_{dc}BR$, where e is the electronic charge (1.6×10$^{-19}$ coulombs) and $I_{dc}$ is the average detector dc current, i.e., $I_{dc} = I_r + I_s$ in Equation 1. If the total power incident on the detector is of the order of 1 µW and the detector quantum efficiency is of the order of unity, then $I_{dc}$ is of the order of 1 µA, and for the same detection bandwidth, the shot noise contribution with a 1 Megohm resistor is of the order of $3.2 \times 10^{-16}$ W.

The excess intensity noise from a broadband source is a Bose-Einstein process. It is given by $\sigma_e^2 = (1+V^2) I_{dc}^2 BR/\Delta v$, where V is the degree of polarization of the light source and $\Delta v$ its frequency bandwidth, which from $v_o \lambda_o = c$, where c is the speed of light, is given by $c\Delta\lambda/\lambda_o^2$. For a source with single polarization (V=0), center wavelength of 1.3 µm, FWHM wavelength bandwidth of 60 nm ($\Delta v = 1.07 \times 10^{13}$ Hz) and the same detector current resistance and bandwidth as used previously, we find $\sigma_e^2 = 10^{-16}$ W.

Reducing the electrical bandwidth B can reduce all the noise components. We note that at the optical power level in the above example, the receiver noise is the lowest, followed by the RIN and the shot noise. However, the RIN is proportional to the square of the DC current, whereas the shot noise is proportional to the current. Therefore there is a crossover point for the detector current above which the RIN becomes dominant. This crossover point is given by $Idc = 2e\Delta v$, or about 3.2 µA (microamps) for the source bandwidth in the above example. If the detector quantum efficiency is taken as 0.8 A/W, then the corresponding optical power at the detector is about 4 µW (microwatts). Therefore, increasing the source power does not improve the SNR if the optical power at the detector exceeds 4 µW (microwatts).

For a splitter 118 having a 50:50 ration, the above implies that the source power should be limited to about 16 µW, the sensing fiber tip reflection (4% in the absence of an antireflection coating) would be 0.16 µW, while the actual signal power, which depends on S(z) would be less than $4 \times 10^{-4}$ µW. In order to increase the signal power and the SNR for a scattering medium, a high-power source (such as 10 milliwatts) can be used together with a highly unbalanced (asymmetrical) splitting ratio (such as 1:500) to increase the amount of light in the sensing arm and reduce the amount of light in the reference arm so that essentially all the power goes to the sensing arm, such as is discussed in more detail below with respect to the present invention. In doing so, it is desirable to minimize the reflection at the tip of the sensing arm, preferably to less than $10^{-5}$% to prevent it from significantly contribute to the detector current.

In a typical LCI or OCT (optical coherence tomography) system, only the magnitude is measured, and Equation 4 essentially gives the signal. More sophisticated systems can be designed to measure both the magnitude and the phase of the signal. Such systems are described in detail in Patent Applications invented by Gerard A. Alphonse and assigned to Medeikon Corporation; U.S. patent application Ser. No. 10/845,853, titled LOW COHERENCE INTERFEROMETRY UTILIZING MAGNITUDE, and U.S. patent application Ser. No. 10/845,849, titled LOW COHERENCE INTERFEROMETRY UTILIZING PHASE, the contents of each are incorporated by reference in the present application in their entirety. For the purpose of discussion, we will limit the rest of this disclosure to amplitude measurements. This does not exclude phase measurements when applicable.

In applications requiring the collection of several LCI traces in a short time, either from a single region or from several regions or directions, the collection of multiple information either in a single trace or by rapidly switching several probe arms into a single interferometer will reduce the time for data collection and interpretation. For example, in probing the circumference of an artery, collecting all the LCI data in a single trace will enable rapid identification of a radial position with vulnerable plaque as compared with healthy ones, and enable selection of specific probing regions for further study or evaluation. The identification can be done by comparing the various components of a trace (addition/subtraction) to quickly determine difference, common features, and provide diagnosis.

Figure 3:
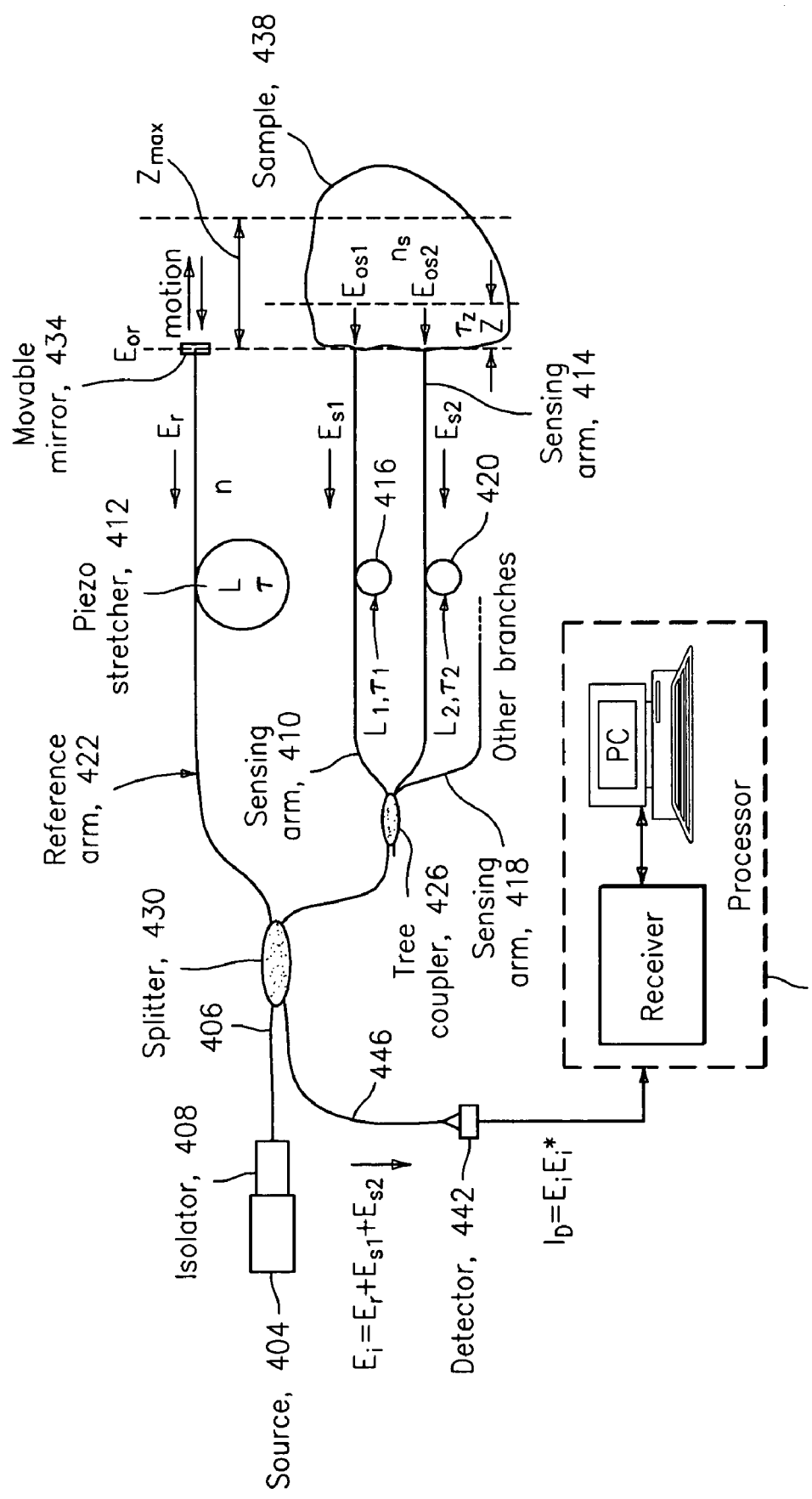
FIG. 3 is a schematic diagram of a Michelson based interferometer with multiple adjustable delay sensing arms that are joined together by a coupler, in accordance with the prior art.

Referring now to FIG. 3, a single trace multi-channel low coherence interferometer is generally shown, such as described in a Patent Application invented by Gerard A. Alphonse et.al. and assigned to Medeikon Corporation, U.S. patent application Ser. No. 04/038,082, titled SINGLE TRACE MULTI-CHANNEL LOW COHERENCE INTERFEROMETRIC SENSOR, the contents of which is incorporated by reference in the present application in its entirety.

In the basic concept, the sensing arm is split into several paths by means of a splitter, each path or probe having a slightly different optical path length than the others, the difference being equal or slightly longer than the optical depth of interest in the sample under test (about 2 mm for measurements inside the human artery). Scanning the variable path length of the reference arm causes the reference path length to sequentially match the length of each individual probe. This results in a single long signal trace, which contains a sequence of all the LCI signals obtained from the individual probes. The total sweep distance or delay in the reference arm is equal to the sum of the individual delays of the various sensing arms. Since an LCI signal is obtained only when the reference path length is equal to the individual sensing arm path lengths, then the individual LCIs will appear in a single trace, being separated by their respective path length differences.

This interferometer has two or more sensing arms each having an adjustable delay 416 and 420, and a reference arm also having an adjustable delay 412. There are multiple sensor arms 410, 414, and 418 and a single reference arm 422. The single sensing arm of the standard interferometer discussed above with reference to FIG. 1 is replaced by a multiplicity of sensing arms joined together by means of a 1:N coupler 426. This coupler 426 splits its input light equally among the N branches. A splitter 430 divides light between the reference and sample sections. The sensing arms and reference arms are coupled to a low coherence light sources 404 and utilize an optional isolator 408. The reference and sample arms of the sensor are configured, by a change in their length, a delay time, position of moveable mirror 434, or a change in the index of refraction of the guide so that the delay for each of the sample arms and reference arm is within the coherence length of the source light. Backscattered sample light from the two or more sensing arms and the reference arm light are coupled together and interference measured by detector 442. A signal proportional to the interference measured for each of the sample arms during a sweep of the delay 412 are displayed, compared to normal material, or digitized using processor 450.

The different branches are shown to probe the same general area of a sample 438. The operation of the system can be analyzed in the same manner as the ordinary interferometer described above with reference to FIG. 1, with the input electric field to the detector being the sum of the electric fields returning from the reference arm 422 and all the sensing arms 410, 414, and 418. The analysis of the interferometer is shown for two sensing arms. In the case of two sensing arms 410 and 414, the total electric field $E_i$ at the detector 442 is the sum of the reference field $E_r$ and those of the two sensing arms $E_{s1}$ and $E_{s2}$.

The interferometer has ability to independently retrieve these two components, in other words to completely or partially prevent them from overlapping in the LCI trace. This is dependent upon the choice of the total scanning distance L, of the reference arm 422, the individual sensing arm distances $L_1$ and $L_2$, and the gating property of the functions $G(\Delta_1)$ and $G(\Delta_2)$ shown below:

$$G(\Delta_1) = \exp\left[-\left(\frac{\Delta_1}{L_c}\right)^2\right] \text{ and} \quad (11)$$

$$G(\Delta_2) = \exp\left[-\left(\frac{\Delta_2}{L_c}\right)^2\right]$$

Figure 4:
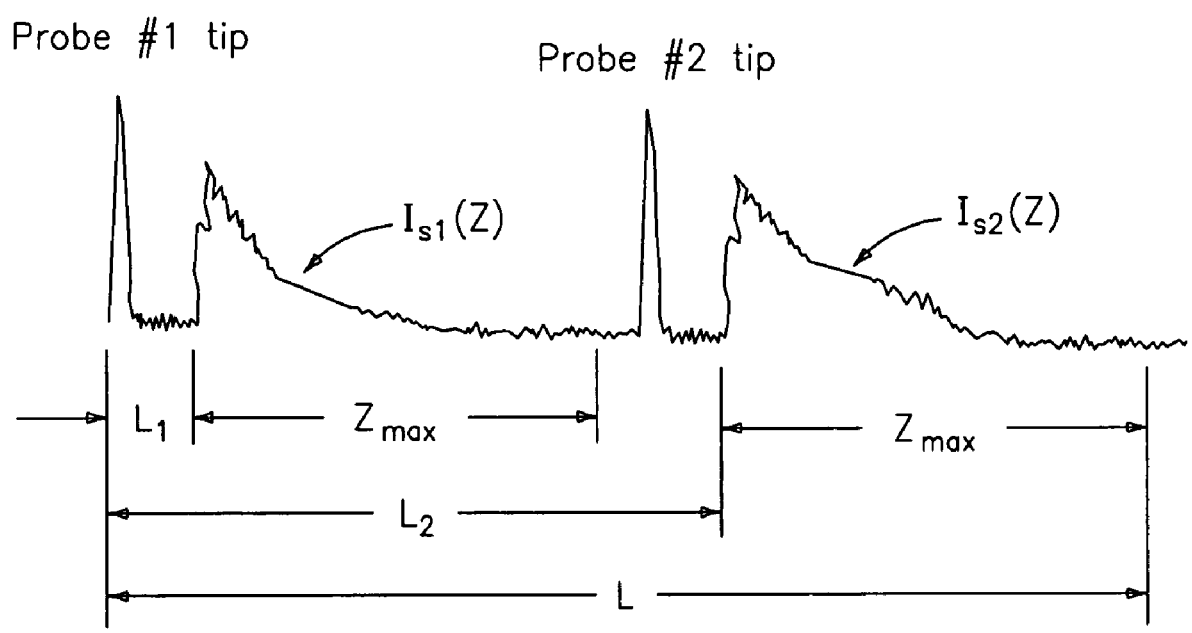
FIG. 4 is a plot of an interference signal trace showing the relation among the various delays elements used to resolve the various interference signals and other components of the interferometer of FIG. 3.

FIG. 4 illustrates how two LCI profiles from separate sample arms can be resolved with a single trace of the reference arm 422. This can be achieved, for example, by allowing the instrument shown in FIG. 3 to scan the reference arm 422 length L at speed v over a time duration t, with the sample arms configured so that $L_2 > L_1 + z_{max}$ and $L > L_2 + z_{max}$. In this configuration independent observe or measure the back-scattered LCI profiles $I_{s1}(z)$ and $I_{s2}(z)$ can be made. FIG. 4 shows the appropriate relationship among $L_1$, $L_2$, $z_{max}$, and L to achieve complete resolution of profiles $I_{s1}(z)$ and $I_{s2}(z)$. If $L_2 = L_1$, then the two signals will occupy the same space in the trace. However, if $L_2 > L_1 + z_{max}$, then $I_{s2}(z)$ will be separated from $I_{s1}(z)$ by a distance equal to $n_2 L_2 - n_1 L_1$ where $n_2$ and $n_1$ are the refractive indices of the sample arms. When $L > L_2 + z_{max}$, then both LCIs will be fully separated and complete, as illustrated in FIG. 4. The configuration and assembly of a sensor with more than two probes where the low coherence interferometric signals from at least two of the sample arms is partially resolved, preferably where the low coherence interferometric signals from all of the sample arms are completely resolved, can be made using these criteria.

The single trace multi-channel low coherence interferometer of FIG. 3, while well suited for particular applications, suffers from a power penalty caused by the 1×N splitting of the sensing light in a round trip through the fiber. In this approach, the sensing light at the detector is divided equally among N probes thus causing a round trip loss of $20 \cdot \log_{10}(1/N)$ which, for six probes (N=6), amounts to 15.6 dB. Furthermore, for a 3-mm signal separation among the probes (2 mm for the sample depth and 1 mm guard space), the total scan length is 18 mm for the six LCI signals, and this requires an air delay line controlled by a linear motor, which is best operated at low speed, of the order of 40 mm/s (millimeter per second).

It would be desirable to allow a short scanning length, just the amount that is sufficient for a single LCI trace, and to have a mechanism that would rapidly switch any one of a number of multiple probes into the interferometric system, enabling the instrument to rapidly probe or "look" in different directions, as determined by the design of the multiple-probe system, without moving parts.

Figure 5:
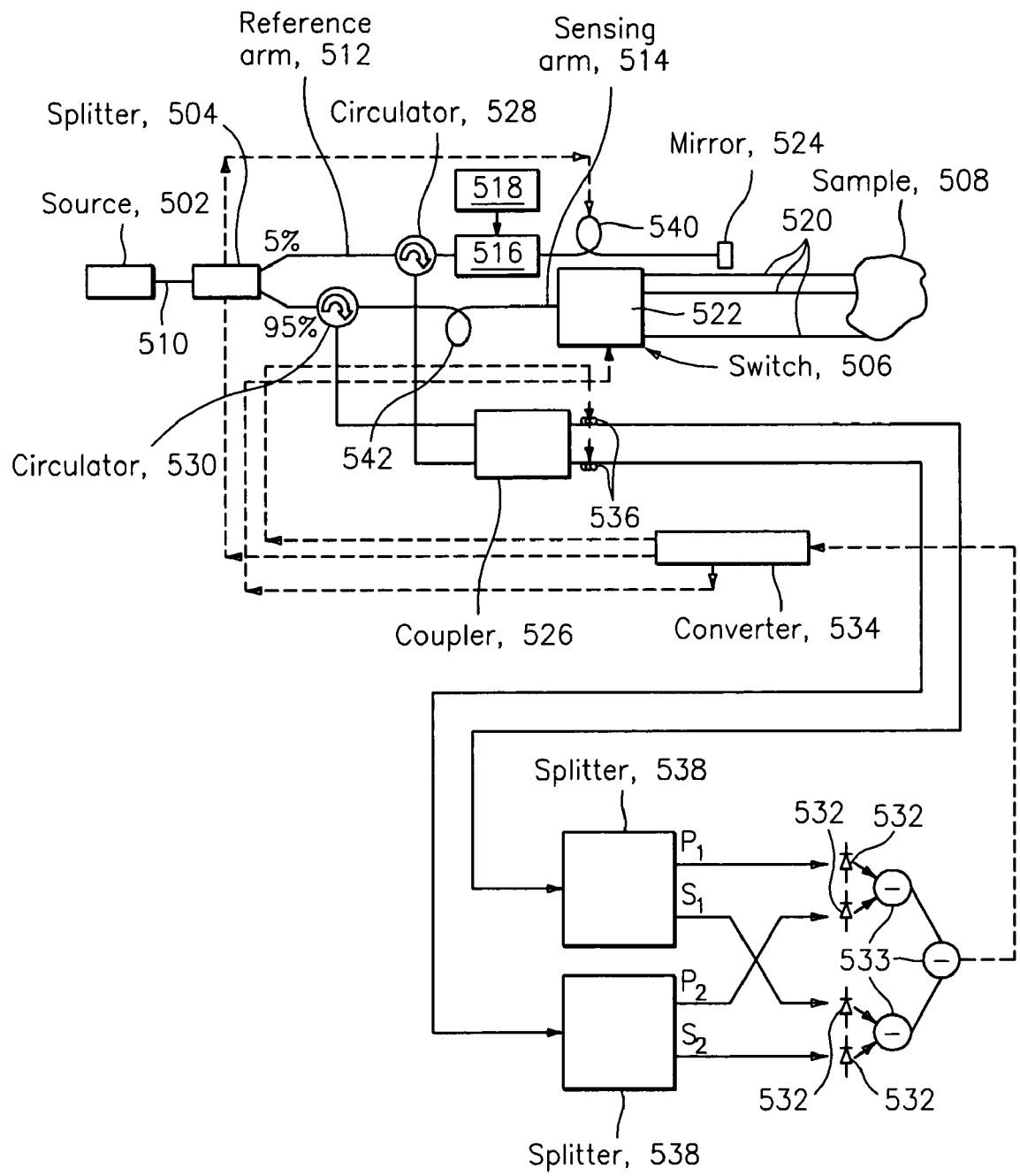
FIG. 5 is a schematic diagram of a Michelson based interferometer with multiple sensing arms that are that are selected by an optical switch, in accordance with an embodiment of present invention.

Referring now to FIG. 5, a switching multiple-probe interferometer in accordance with an embodiment of the invention is generally shown. This switching multiple-probe interferometer seeks to maximize both the optical signal to noise ratio and speed. The capability of having an arbitrary number of sensing probes without sacrificing speed to enable real-time imaging is advantageous in many applications, such as with biological tissues. Further, fabrication constraints are minimized and assembly is simplified with this multi-probe interferometer as compared to the above-discussed prior art.

This interferometer employs a broadband light source 502, such as a high-power superluminescent diode (SLD) on the order of 20 mW or more. It is desirable to keep the reference light below the RIN-dominated level for the SNR, whereby a fiber splitter 504, with high asymmetrical splitting ratio, is used to direct a large fraction of the light source power to a multiple probe system 506 for delivery of the maximum amount of available light to a test sample 508. In the present example a 5:95 splitting ratio is illustrated, as such is presently commercially available, but other high splitting ratios may also be employed, e.g., 10:90, 20:80 or more generally [x:100−x]). The SLD 502 is coupled to the fiber splitter 504 by a fiber 510. The fiber splitter 504 results in a reference arm 512 and a sensing arm 514. The multiple probe system 506 is located at the distal end in of the sensing arm 514. In order to reduce (attenuate) the reference light further as desired to maximize the SNR, an electrically controlled variable optical attenuator (VOA) 516 is introduced into the reference arm 512. With the high-power light source, the VOA assists in reducing the reference light beyond levels obtained by the asymmetric splitter. Automatic electrical control of the VOA 516 is provided by a digitally controlled voltage source (DCV) 518.

The sensing arm 514 is split into a multiplicity of probe arms 520 by means of an electrically controlled 1×N switch 522 (N=6 in the embodiment of FIG. 5) to select only one of the probe arms 520 for the sensing arm 514 of the interferometer. Optical switch 522 is a MEM-based device in which the sensing fiber at the input port can be randomly or sequentially connected to any of the N output fibers (probe arms) by the application of a digital code under computer control. Such switches are known in the art of optical fiber communications. Available optical switches have switching time of the order of 250 to 500 µs (0.25 to 0.5 milliseconds). Light is reflected in the reference arm 512 by a mirror 524, which is then combined with the light reflected or backscattered into the sensing arm 514 from the sample 508 being probed into a 2×2 coupler 526 by means of three-port optical circulators 528, 530. An optical circulator is a device that transfers light from an input port to a second port and transfers the light reflected from the second port to a third port. In this manner, it protects the source from undesired reflection and makes all the reflected light available for systems operation. The 2×2 coupler 526 combines the reflected reference and sensing lights in order to enable interference at a detector, which is comprised of a pair of balanced photodetectors 532 utilizing the two outputs of the coupler 256. An advantage of the balanced photodetectors is that they add the signals and subtract the common-mode noise, such as the RIN discussed above. Polarization controllers 536 and polarization splitters 538 are introduced at the outputs of the coupler 256. The outputs of the detectors 532 are combined by analog subtractors 533 and applied to a digital to analog converter (DAQ) 534, which is associated with a processor, that digitally processes it for further use. Alternatively, it can be envelope-detected to produce a signal similar the trace shown in FIG. 2, and then processed by the DAQ 534.

An important feature of interferometry is that interference can occur only between light components having the same polarization, besides having equal optical effective path lengths. The light from the SLD 502 is linearly polarized. However, upon propagation in a single mode (SM) fiber beyond a certain distance called "depolarization length" (e.g., about one meter), its polarization remains linear, but its plane changes to a different direction in an unpredictable manner. Additional polarization changes also occur with fiber manipulation. An SM fiber can support light propagation in two orthogonal directions, called "S" and "P". If light is injected in one polarization plane, such as the S polarization state for example, then after propagation through the depolarization length, some unpredictable amount will be propagating in the P state. As a result, the polarizations of the reference and sensing lights are not matched and the detected LCI interference amplitude is not optimized and varies unpredictably with fiberhandling.

Thus, it is highly desirable to configure the interferometer to be polarization-independent. Ideally, this could be accomplished by using polarization-maintaining (PM) fibers, but PM fibers are expensive, difficult to handle, and subject to dispersion. It is desirable to use SM fibers, which are easier to handle and less expensive, but the polarization, hence the signal, is subject to fluctuations. SM fiber is utilized in this embodiment for all of the fiber in the interferometer, including the reference and sensing arms, the probe arms, and the fiber at the coupler. In order to make the interferometer using SM fibers polarization-insensitive and ensure that the maximum interference signal is obtained regardless of the polarization state of the light in the fiber, the mirror 524 is preferably a Faraday Rotator Mirror (FRM), and polarization controllers 536 and polarization splitters 538 are introduced at the outputs of the coupler 526. The polarization splitters 538 in combination with the pair of balanced photodetectors 532 define a polarization-diversity receiver.

The FRM 524 is a Faraday Rotator with a mirror at its end. The Faraday Rotator uses a birefringent crystal adjusted to rotate the plane of polarization by 45 degrees. Upon reflection from the mirror, the light is rotated by another 45 degrees upon propagation through the Faraday Rotator. As a result, the light undergoes a total rotation of 90 degrees. In other words, whatever was in the S state goes into the P state upon reflection, and vice-versa. Therefore, after a round trip through the SM fiber of the reference arm the state of polarization of the reflected light is the same as that at the input of the fiber. In the interferometer, this process is used to maintain the polarization state of the reference light. At the output of the coupler 526, the state of polarization of the sensing light remains unknown, but the two polarization controllers 536, which can be electrically (and/or manually) adjusted, are set such that equal amounts of total light (reference and sensing) exist at the two outputs, designated $P_1$ & $S_1$ and $P_2$ & $S_2$.

While a single channel DAQ 534 has been described above, a four channel DAQ could be employed to digitize all four outputs from the photodetectors 532 and perform the operations in digital domain or even digitize two channels of the analog subtractors 533 and perform the rest of the signal processing in digital domain, such being readily apparent to one skilled in the art.

Probe arms 520 (or probes) are designed and fabricated for the application of interest. For example, for cardiovascular work, the probes can be a set of single-mode fibers designed to aim their light toward an arterial wall and configured to fit inside a catheter. Once a particular probe 520 from the set of N is selected, the interferometer functions as discussed above, i.e., as if the selected arm were the only sample arm. Interference between the reference arm and sample arm light occurs when the optical path length between the two is within the coherence length of the source light. A device that stretches the fiber can provide this length or delay. This stretching can be achieved by winding part of the fiber around a piezoelectric (PZT) drum to which a voltage is applied. The PZT stretcher has the advantage of using no mechanical moving parts, and therefore can be relatively fast. By applying a voltage ramp to the PZT, the length can be changed or scanned over a given range to provide path length matching with the light from within the sample under study. Scanning changes the relative path length between the reference arm and the sensing arm and acquire the LCI signal. It is sufficient to scan only over a length corresponding to the desired probing depth in the sample. For probing arterial plaques in humans, the probing depth is about 2 mm, including about 0.5 mm for propagation through blood. In this case, it is advantageous to scan by means of a PZT stretcher, having a scan rate of over 1000 mm per second by the application of a ramp of up to about 540 Volts to produce an optical path stretch of up to about 5 mm in 5 ms (milliseconds). More speed or more stretching is available by using two fiber stretchers 540 and 542, one in the reference arm, the other in the sensing arm, and driving them in opposite directions. The PZTs are biased and driven in a push-pull configuration, i.e., with opposite voltages so that one undergoes increased stretching while the other undergoes decreased stretching. This push-pull configuration is an important feature of the present invention. The push-pull configuration amounts to doubling the scan rate if the desired path length difference is less than the maximum change. Alternatively, it also doubles the effective scan range for the same total scan time if a range larger than that of a single scanner is desired. Either way, it can give an effective scan depth of 2 mm in just about 1 ms, giving a total switching and scan time of 1.5 ms per LCI scan with a 0.5 ms switch. In the present example, N=6 whereby the total LCI acquisition time for six probes would be 9 ms. By contrast, the prior art discussed above with reference to FIG. 4, in which the six LCIs would be in one scan, an air delay line would have to be used for the total scan length, with a typical scan rate of only about 40 mm/s. Such a system would require a guard space of about 1 mm between the LCIs for adequate separation, yielding a scan length of 18 mm or a scan time of 0.45 seconds. It will be noted that the speed of present commercial linear scanners can be twice as high as quoted. By the same token, for a small stretching of 1 mm, a PZT stretcher can be designed to operate at a much higher speed than quoted (by reducing PZT mass and fiber length), thus maintaining the speed advantage of the optical switch-based multiple-probe interferometer. Also, the Doppler frequency of the LCI signal with a faster scan increases with the scan rate. This does not add any speed burden on the DAQ because the raw LCI signal can be envelope-detected. Envelope detection prior to analog-to-digital conversion yields the correct baseband signal regardless of Doppler frequency.

The use of the optical switch 522 has a number of advantageous features over the splitter 430 described in the prior art of FIG. 4. One advantage is that the optical switch 522 has a much lower insertion loss than the splitter 430. For example, the insertion loss of a commercial 1×6 switch is only about 2.4 dB as compared to 15.6 dB for a commercial splitter with the same number of ports. Another advantage is that the optical switch 522 is more power-efficient. Aside from the small insertion loss, the switching process transfers all the input power to the selected output port, and therefore it provides an SNR improvement of $20 \log(1/N)$ over the prior art of FIG. 4. Yet another advantage is that as each of the probe arms 520 have the same nominal length rather than differing in length by ΔL, as required in the prior art of FIG. 4, thus demanding the scanning delay line mechanism to be able to handle a longer path length difference, as compared to a fast scanning short delay providing PZT stretchers 540, 542. This allows for multiple signal averaging and/or completing the scanning of any biological tissue and/or organ at a rapid pace. Still another advantage is that the number of probe arms 520 can be expanded to an arbitrary number of probe arms without speed penalty and only with a small total insertion loss penalty, by cascading into several levels and simultaneous switch selection for all levels.

Figure 6:
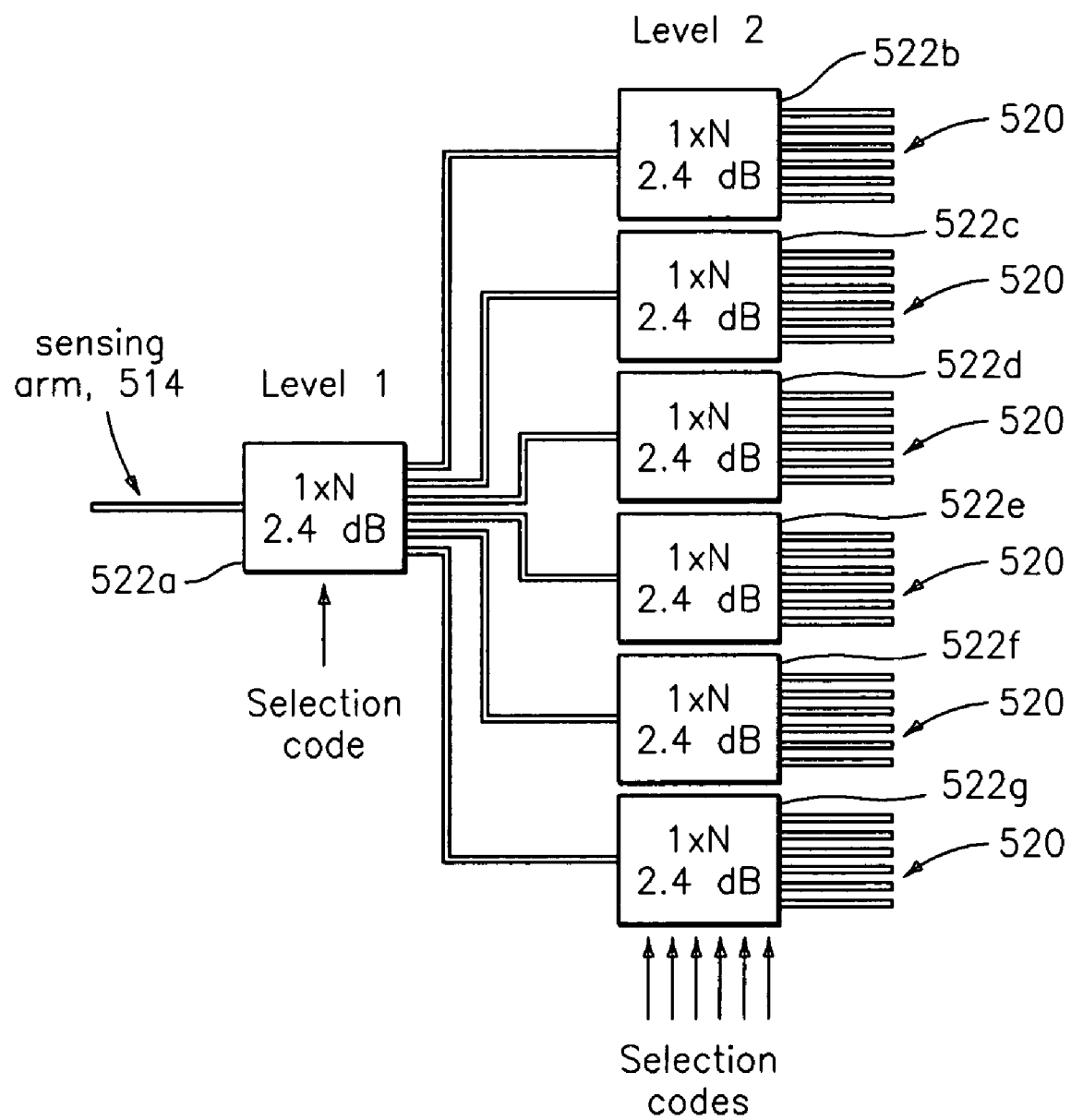
FIG. 6 is a schematic diagram of a multi-level optic switch configuration for use with the interferometer of FIG. 5.

Referring to FIG. 6, N+1 switches 522*a-g* are arranged in a two-level cascaded configuration, all having the same access time and insertion loss. In the present exemplary embodiment, N equals 6 for a total of 36 probes (or probe arms) 520, but it will be appreciated that N can be any number. It will further be appreciated that each switch 522a-g having the same access time, can select any one of the probes 520, which is 0.5 ms in the example that is chosen. The first level comprises switch 522a, which has six outputs. Each output fiber in that level is connected to the input of a set of the other six switches 522b-g constituting the second level, and the process can be extrapolated in the same manner to additional levels. The selection of a particular output fiber is done by simultaneously applying a code to the switch 522a at the first level and to the appropriate switch among 522b-g at the second level. Since all the switches are independent and have the same switching time (e.g., 500 microseconds), then they can be selected at the same time by random access, therefore giving the same access time to any particular probe in the N×N system. The only penalty is an increase of loss by the amount of insertion loss of the selected switch in the second level. In the present exemplary embodiment, the total insertion loss would be 4.8 dB. By comparison, the loss in the prior art system described with reference to FIG. 4, would be 10 $\log(1/N^2)$ or about 31 dB, the access time would be six times longer, and access to the individual probes is constrained to be serial not be randomly accessible. An additional advantage of the present invention over the prior art system described with reference to FIG. 4 is the relaxed tolerance on the probe fiber lengths. Whereas each fiber in the prior art system described with reference to FIG. 4 must have lengths that are different from one another by a precise amount, the only length requirement in the switch approach is that the fibers in any probe arm 520 have the same nominal total length (within manufacturing tolerance, which can be of the order of less than 1 millimeter). The relaxed length requirement lends itself well to mass fabrication.

Figure 7:
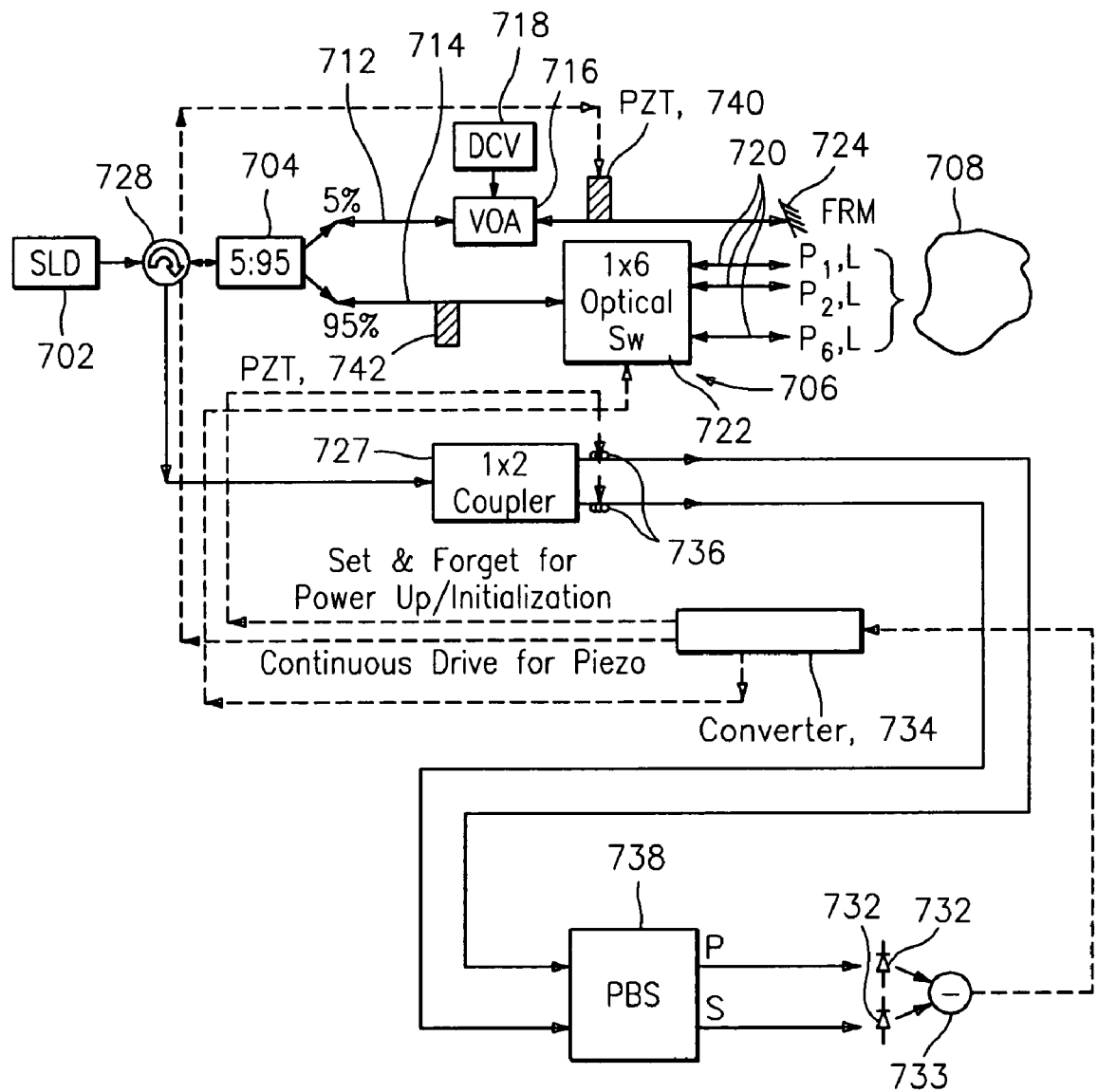
FIG. 7 is a schematic diagram of a Michelson based interferometer with multiple sensing arms that are that are selected by an optical switch, in accordance with another embodiment of the present invention.

Referring to FIG. 7, a switching multiple-probe interferometer in accordance with as alternate embodiment of the present invention is generally shown. This interferometer employs a broadband light source 702, such as a high-power superluminescent diode (SLD). The SLD 702 is connected to an input port of a three-port optical circulator 728. An optical circulator is a device that transfers light from an input port to a second port and transfers the light reflected from the second port to a third port. In this manner, it protects the source from undesired reflection and makes all the reflected light available for systems operation. An output port of the optical circulator 728 is connected to a fiber splitter 704. It is desirable to keep the reference light below the RIN-dominated level for the SNR, whereby the fiber splitter 704, with a high asymmetrical splitting ratio, is used to direct a large fraction of the light source power to a multiple probe system 706 for delivery of the maximum amount of available light to a test sample 708. In this embodiment a 5:95 splitting ratio is also illustrated, as such is presently commercially available, but other high splitting ratios may also be employed as previously discussed. The fiber splitter 704 results in a reference arm 712 and a sensing arm 714. The multiple probe system 706 is located at the distal end in of the sensing arm 714. In order to reduce (attenuate) the reference light as desired to maximize the SNR, an electrically controlled variable optical attenuator (VOA) 716 is introduced into the reference arm 712. With the high-power light source, the VOA assists in reducing the reference light beyond levels obtained by the asymmetric splitter. Automatic electrical control of the VOA 716 is provided by a digitally controlled voltage source (DCV) 718.

The sensing arm 714 is split into a multiplicity of probe arms 720 by means of an electrically controlled 1×N switch 722 (N=6 in the embodiment of FIG. 7) to select only one of the probe arms 720 for the sensing arm 714 of the interferometer. Optical switch 722 is a MEM-based device in which the sensing fiber at the input port can be randomly or sequentially connected to any of the N output fibers (probe arms) by the application of a digital code under computer control. Light is reflected in the reference arm 712 by a mirror 724 (preferably a Faraday Rotator Mirror (FRM)), which is then combined with the light reflected or backscattered into the sensing arm 714 from the sample 708 being probed into a 1×2 coupler 727 by the three-port optical circulator 728. The 1×2 coupler 726 receives the combined reflected reference and sensing lights from the optical circulator 728 in order to enable interference at a detector, which is comprised of a pair of photodetectors 732 in communication with the two outputs (P and S) of the coupler 757. An advantage of the dual photodetectors (one for P and one for S) is that they add the signals and subtract the common-mode noise, such as the RIN discussed above. It is desired to reduce the power incident on each photodetectors, by driving VOA to give rise to a desired value of attenuation, below 2 to 5 µW, then RIN does not dominate the noise in the detector circuitry. Polarization controllers 736 and polarization splitter 738 are introduced at the outputs of the coupler 757. The output of the detectors 732 is combined by an analog subtractor 733 and applied to a digital to analog converter (DAQ) 734, which is associated with a processor, that digitally processes it for further use. Alternatively, it can be envelope-detected to produce a signal similar the trace shown in FIG. 2, and then processed by the DAQ 734.

Probe arms 720 (or probes) are scanned by changing the relative path length between the reference arm and the sensing arm, and acquiring the LCI signal. Two PZT fiber stretchers 740 and 742, one in the reference arm, the other in the sensing arm are used for scanning and are driving in opposite directions, as discussed in the previous embodiment. The PZTs are biased and driven in push-pull, i.e., with opposite voltages so that one undergoes increased stretching while the other undergoes decreased stretching. This amounts to doubling the scan rate if the desired path length difference is less than the maximum change. Alternatively, it also doubles the effective scan range for the same total scan time if a range larger than that of a single scanner is desired.

The embodiments of FIGS. 5 and 7 are operated as Optical Time Domain Interferometry (OTDI), because of their operation in the time domain, i.e. the direct output of the detectors is a signal in the time domain, which is calibrated in terms of distance from the value of the scanning rate. Another approach to interferometry is Optical Frequency Domain Interferometry (OFDI). As its name implies, the signal is obtained in the frequency domain. The OTDI systems described above can be configured to operate as OFDI systems, by: utilizing a light source which is a scanning laser or a swept laser, i.e., a laser that can be externally tuned at a given rate, in place of light source 502 (FIG. 5), 702 (FIG. 7); PZT stretchers 540 and 542 (FIG. 5), 740 and 742 (FIG. 7) are not required, because the use of a swept laser (or a frequency scanner) eliminates the need for a depth scanner to match the optical length of the reference and sensing arms. As a result, the signal obtained is in the frequency domain, and therefore a Fourier transformation is required to convert the detected signal to a signal that is a depth profile. This is accomplished simply by adding an FFT (Fast Fourier Transform) stage to the processor. A swept laser may be a broadband source such as an SLD in a cavity containing a grating, which can be rotated. This yields a tunable laser, i.e., a narrow band source whose output wavelength within the broadband spectrum is determined by the position of the grating. Such tunable lasers are available commercially or by custom design with available sweep range larger than the FWHM bandwidth of the SLD. In the present example, a swept laser is formed from a 1,310 nm SLD, producing laser light with linewidth of about 0.1 nm, sweeping a range of 80 nm (from 1270 nm to 1350 nm) in a 1 millisecond timeframe. This is equivalent to a chirped laser with the wavelength is changing at a rate 80 nm per millisecond.

In operation, the laser is chirped as described above and the LCI signal is continuously obtained during the chirp time. Since the instantaneous laser linewidth is 0.1 nm, the coherence length of each instantaneous laser is of the order of 7.5 mm. Since the LCI depth is of the order of the coherence length, and since the depth of the signal of interest in cardiovascular applications is of the order of 2 mm, there is no need to scan the reference arm length as in the case of the OTDI. However, due to the frequency chirping in the OFDI case, the LCI signal is a function of frequency. The total LCI is obtained by integration over the scan time, and according to theory, it is a function of frequency which, when converted to the time domain by Fourier transformation, reproduces the time-domain LCI signal with a resolution corresponding to the sweeping width. If the sweep width is 80 nm, then the resolution of the OFDI system is 9.4 microns.

The OFDI systems have several advantages over the OTDI systems. The OFDI systems have a depth range given by the coherence length of the laser elements of the tunable laser, which, being longer than the required depth for cardiovascular diagnostics, makes it unnecessary to use a scanner in the reference or sensing arm. Although a modulator could be used for fine adjustments of the optical path lengths. The chirping range of the tunable laser source determines the resolution. In particular, if the tunable laser uses an SLD as the gain medium, then with appropriate hardware correction factor, the tuning range can be made two to three times the FWHM bandwidth of the SLD, hence improving the LCI resolution by the same factor (resolution below 10 microns are readily possible). If the scanning laser is made from an SLD amplifier, the optical power per individual laser is at least the same as the full SLD power under the same drive condition (a laser is much more efficient than an SLD), so the number of photons per unit bandwidth is larger than for the OTDI by at least two orders of magnitude, thus giving it a significant advantage in signal-to-noise ratio (SNR). Even more importantly from the point of view of SNR, the instantaneous bandwidth of the source is narrow, being a laser. Therefore, the SNR is limited only by shot noise, whereas the noise in the OTDI is limited by the RIN of the broadband source, which dominates the response above about 4 microwatts of optical power at the detector. Hence, the OFDI system can operate at a much higher source power level than the OTDI system.

Referring now to FIGS. 8A and B, fibers (probes 520, FIG. 5 or 720, FIG. 7) are assembled around a thin solid and flexible central guide wire 966, such that the fiber assembly itself can act as its own guide. The outer surface of the fibers can be enclosed for example using shrinkable latex or other polymeric and chemically compatible tubing 970 defining a housing. An internal guide wire is useful when a compact sensor is desired. It will be described further in connection with the geometry of an optical head 946.

The various probes of the interferometer sensor, for example probes 520, FIG. 5 or 720, FIG. 7 are brought together and placed inside a housing 970. The device having guide wire 966 and optical head 946, is essentially a wire-guided catheter, which can be inserted in an artery 954 using conventional medical procedures and the radial light 972, 976 into and backscattered from the sample and others not shown, from optical head 946 of the device used to detect a vulnerable plaque 962 covering a lipid 958 pocket in the artery 954. This plaque consists of a layer of calcified material and a lipid pool between it and the arterial wall. The widths of the plaque and lipid regions are measures of their respective thicknesses. The number of fibers that can be placed inside the housing 970 can vary and along with the dimensions of the waveguides, and will vary depending on the inside diameter of the guide wire or conduit used as a guide. In one exemplary embodiment, this device is used to probe the walls of an artery, which may contain vulnerable plaques. The ends of the probes (fibers) are configured such that the output lights of the fibers are directed toward the arterial walls, e.g., pointing to different radial directions. All six LCI profiles (in this example one for each of the fibers) are individually obtained either sequentially or by random access. The scan can be digitized and the various profiles can be separated and stored in the computer memory for processing.

An optical head that propagates light from the waveguides of the sensor can be positioned at the distal end of a borescope, endoscope, or catheter. The optical head provides physical and chemical protection to the waveguides and may incorporate or be adjacent to a conduit in the device that provides fluid irrigation to the distal end of the sensor. Light in optical fibers is guided along the axis of the fiber. To aim the light at the wall of a conduit, a cavity, or a tissue such as an artery, light from the fibers can be directed at an angle from their axis to the walls. The point of borescope, catheter, or endoscope entry and the area to be examined can be used to modify the direction of view that a reflecting prism can be fashioned to direct the source light. If the subject is straight ahead of an entry hole an approximately 0° direction-of-view can be used and information from the fibers used to scan an area of the surface.

Field-of-view from the borescope or endoscope time may range from 10 to about 90 degrees and can be chosen based on the distance from the distal end of the borescope to the subject. A borescope, can have has a very large depth of field which can be from infinity down to a centimeter or less. Borescopes and endoscopes of the present invention may be rigid or flexible and can use but are not limited to fiber optic illumination to carry light from an external light source through a flexible light guide, then through the borescope, to the distal end.

This prophetic example illustrates how a version of the present invention can be used for detecting plaque within the coronary or other patient vasculature. The apparatus and techniques could also be applied to characterizing lesions in other body lumens, which are associated with various disease conditions. The methods and apparatus can be implemented within the body lumen to identify diseased tissue or monitor the course of treatment for a particular condition. The apparatus is able to interrogate the body lumen over a relatively long distance to characterize the tissue in an efficient fashion by providing interferometric information on the tissue from multiple probes in a single sweep of a variable delay of the apparatus.

Coronary artery disease resulting from the build-up of atherosclerotic plaque in the coronary arteries is a leading cause of death. The build-up of plaque causes a narrowing of the artery, commonly referred to as a lesion, which reduces blood flow to the myocardium (heart muscle tissue). Myocardial infarction can occur when an arterial lesion abruptly closes the vessel, causing complete cessation of blood flow to portions of the myocardium. Even if abrupt closure does not occur, blood flow may decrease resulting in chronically insufficient blood flow, which can cause significant tissue damage over time.

Plaques, which form in the coronaries and other vessels, comprise inflammatory cells, smooth muscles cells, cholesterol, and fatty substances, and these materials are usually trapped between the endothelium of the vessel and the underlying smooth muscle cells. It is expected that these lesions will have optical properties that differ from the surrounding healthy tissue. The difference in the optical properties may be detected and characterized by a change in incident source light of one or more wavelengths backscattered from the sample. Depending on various factors, including thickness, composition, and size of the deposited materials, the plaques can be characterized as stable or unstable. A cap and/or an endothelial layer normally cover the plaque. When the cap and/or endothelial layer is disrupted, the ruptured plaque releases highly thrombogenic constituent materials, which are capable of activating the clotting cascade and inducing rapid and substantial coronary thrombosis. Such plaque is referred to as unstable or vulnerable, and the resulting thrombus formation can cause unstable angina chest pain, acute myocardial infarction (heart attack), sudden coronary death, and stroke. Based upon the light backscattered source light of one or more wavelengths from the artery walls, the sensor of the present invention may be used to determine the location, chemical and physical properties, and nature of the lesion in an artery. This information can be used to facilitate determining whether the plaque is stable or unstable, and may be used to treat and monitor the treatment.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A system for determining a characteristic of a sample, the system comprising:
    a light source for providing a light;
    a splitter receptive to said light from said light source to produce a sensing light portion and a reference light portion, said splitter having an asymmetrical ratio such that said sensing light portion is greater than said reference light portion;
    a sensing light path comprising,
        a light path configured to communicate said sensing light portion from said splitter and said sensing light portion reflected from the sample,
        a plurality of probe light paths configured to direct said sensing light portion at the sample and to receive said sensing light portion reflected from the sample, and
        an optical switch selectable to define communication between said light path and a selected at least one of said probe light paths;
    a reflecting device;
    a reference light path configured to communicate said reference light portion from said splitter, said reference light path further configured to direct said reference light portion at said reflecting device and to receive said reference light portion reflected from said reflecting device;
    means for generating an interference condition between said sensing light portion reflected from the sample and said reference light portion reflected from said reflecting device;
    a detector receptive to said sensing light portion reflected from the sample and said reference light portion reflected from said reflecting device, said detector generating a signal indicative of an interference of said sensing light portion reflected from the sample and said reference light portion reflected from said reflecting device; and
    processing means configured to determine a characteristic of the sample from said signal indicative of said interference of said sensing light portion reflected from the sample and said reference light portion reflected from said reflecting device.

2. The system of claim 1 wherein said asymmetrical ratio is about x:100–x, where 100–x represents a relative amount of said sensing light portion and x represents a relative amount of said reference light portion in said asymmetrical ratio.

3. The system of claim 1 wherein said optical switch is digitally selectable.

4. The system of claim 1 wherein the sample comprises a biological sample.

5. The system of claim 1 wherein said probe light paths are configured as a catheter.

6. A method for determining a characteristic of a sample, the method comprising:
    asymmetrically splitting a light from a light source into a sensing light portion and a reference light portion, said sensing light portion being greater than said reference light portion;
    selecting a probe light path from a plurality of probe light paths, said probe light paths forming a portion of a sensing light path;
    directing said sensing light portion by means of said sensing light path, including the selected at least one of said probe light paths, at the sample;
    receiving said sensing light portion reflected from the sample by means of said sensing light path, including the selected at least one of said probe light paths;
    directing said reference light portion by means of a reference light path at a reflecting device;
    receiving said reference light portion reflected from said reflecting device by means of said reference light path;
    generating an interference condition between said sensing light portion reflected from the sample and said reference light portion reflected from said reflecting device;
    detecting said sensing light portion reflected from the sample and said reference light portion reflected from said reflecting device, to generate a signal indicative of an interference of said sensing light portion reflected from the sample and said reference light portion reflected from said reflecting device; and
    determining a characteristic of the sample from said signal indicative of said interference of said sensing light portion reflected from the sample and said reference light portion reflected from said reflecting device.

7. The method of claim 6 wherein said light comprises a broadband light.

8. The method of claim 6 wherein said light comprises laser lights.

9. The method of claim 6 wherein the sample comprises a biological sample.

* * * * *